(12) United States Patent  
Koseki

(10) Patent No.: US 9,021,700 B2
(45) Date of Patent: May 5, 2015

(54) METHOD OF MANUFACTURING LIQUID JET HEAD, LIQUID JET HEAD, AND LIQUID JET APPARATUS

(71) Applicant: SII Printek Inc., Chiba (JP)

(72) Inventor: Osamu Koseki, Chiba (JP)

(73) Assignee: SII Printek Inc. (JP)

( * ) Notice: Subject to any disclaimer, the term of this patent is extended or adjusted under 35 U.S.C. 154(b) by 0 days.

(21) Appl. No.: 13/846,559

(22) Filed: Mar. 18, 2013

(65) Prior Publication Data
US 2013/0271531 A1   Oct. 17, 2013

(30) Foreign Application Priority Data

Apr. 12, 2012   (JP) .................................. 2012-091030

(51) Int. Cl.
B21D 53/76       (2006.01)
B23P 17/00       (2006.01)
B41J 2/045       (2006.01)
B41J 2/16        (2006.01)
B29D 99/00       (2010.01)
B41J 2/14        (2006.01)

(52) U.S. Cl.
CPC ............... B41J 2/1607 (2013.01); B29D 99/00 (2013.01); B41J 2/14201 (2013.01); B41J 2/14209 (2013.01); B41J 2/1609 (2013.01); B41J 2/1623 (2013.01); B41J 2/1632 (2013.01); B41J 2/1642 (2013.01); B41J 2/1643 (2013.01); B41J 2/1646 (2013.01); B41J 2002/14491 (2013.01)

(58) Field of Classification Search
None
See application file for complete search history.

(56) References Cited

U.S. PATENT DOCUMENTS

| 2001/0030673 | A1  | 10/2001 | Shigemura   | 327/68 |
| 2001/0055049 | A1* | 12/2001 | Isono et al.| 347/68 |
| 2004/0051751 | A1  |  3/2004 | Sekiya      | 347/19 |
| 2011/0292115 | A1  | 12/2011 | Koseki      | 347/20 |
| 2011/0292135 | A1* | 12/2011 | Koseki      | 347/71 |

FOREIGN PATENT DOCUMENTS

JP       2002172789       6/2002

OTHER PUBLICATIONS

British IPO Search Report mailed Oct. 9, 2013 issued in GB Appln. No. GB1306629.5.

* cited by examiner

Primary Examiner — Matthew Luu
Assistant Examiner — Erica Lin
(74) Attorney, Agent, or Firm — Adams & Wilks

(57) ABSTRACT

A method of manufacturing a liquid jet head comprises forming a terminal region on a top surface of an actuator substrate in the vicinity of a rear end thereof, and forming on the top surface a plurality of alternately arrayed ejection grooves and dummy grooves arranged in parallel to each other from a front end toward the terminal region. Shallow grooves are formed in the terminal region, and a conductive film is formed on the top surface, side surface and bottom surface of each of the ejection grooves, and on the side surface and bottom surface of the shallow grooves. The conductive film is removed from the top surface by grinding, and a cover plate is bonded to the actuator substrate so as to expose the terminal region and cover the ejection grooves. A nozzle plate is adhered to a side surface of the actuator substrate at which the ejection grooves are opened.

7 Claims, 15 Drawing Sheets

METHOD OF MANUFACTURING LIQUID JET HEAD, LIQUID JET HEAD, AND LIQUID JET APPARATUS

BACKGROUND OF THE INVENTION

1. Field of the Invention

The present invention relates to a method of manufacturing a liquid jet head which ejects a liquid droplet to perform recording on a recording medium, and to a liquid jet head and a liquid jet apparatus.

2. Description of the Related Art

In recent years, there has been used an ink-jet type liquid jet head which ejects ink droplets on recording paper or the like to record characters or graphics thereon, or ejects a liquid material on a surface of an element substrate to form a functional thin film thereon. In the liquid jet head of this type, ink or a liquid material (hereinafter referred to as liquid) is guided from a liquid tank via a supply tube to a channel, and pressure is applied to the liquid filled in the channel, to thereby eject the liquid from a nozzle communicating to the channel. At the time of liquid ejection, the liquid jet head or a recording medium is moved to record characters or graphics, or to form a functional thin film in a predetermined shape.

As the liquid jet head of this kind, there is known a shear mode liquid jet head. In the shear mode liquid jet head, a large number of grooves arranged in parallel to each other are formed in a top surface of a piezoelectric material substrate subjected to polarization treatment in a direction perpendicular to the top surface, and an electric field is applied in a direction of the thickness of a side wall between adjacent grooves to cause thickness slip deformation of the side wall. In this manner, pressure is applied to the liquid filled in the groove to eject a liquid droplet from the nozzle communicating to the groove. In recent years, along with the demand for higher density in recording dots, pitches of the grooves are becoming narrower, and an electrode pattern is becoming finer.

Japanese Patent Application Laid-open No. 2002-172789 describes a method of manufacturing a liquid jet head, including forming a large number of grooves in the piezoelectric material substrate and forming a conductive film by an electroless plating method. First, two piezoelectric material substrates, which are each subjected to polarization treatment in the direction perpendicular to the substrate surface, are bonded to each other with an adhesive under a state in which their polarization directions are directed to be opposite to each other. Next, the entire upper surface of the piezoelectric material substrate is covered with a liquid resist or a dry film, and the liquid resist or the dry film is cured. Next, a dicing blade is used to form parallel grooves in a plurality of rows, which each have a groove width of 70 µm and a depth of 300 µm. Next, hydrophilic treatment is performed to reform the top surface of the piezoelectric material substrate, and then plating pretreatment is performed so that plating catalyst adheres on the entire surface of the piezoelectric material substrate. Next, a plating film is formed by an electroless plating method. Next, the resist film (or the dry film) as well as the plating film is removed from upper surfaces of drive walls by a lift-off method for removing the resist film (or the dry film).

FIG. 22 is a perspective view of a piezoelectric material substrate 101 obtained after the above-mentioned treatment (FIG. 7 of Japanese Patent Application Laid-open No. 2002-172789). The piezoelectric material substrate 101 includes channel portions 102 formed of a large number of parallel grooves. The channel portions 102 are separated from one another by drive walls 103. In the upper surface of each of the drive walls 103, a plating film 120 is removed by the lift-off method and the piezoelectric material substrate 101 is exposed. Other surfaces are covered with the plating film 120.

Next, a photosensitive electrodeposition resist is caused to adhere to the piezoelectric material substrate 101 to form a resist film 130 on the plating film 120. Next, a region in which the electrode pattern is to be formed is shielded from light by a light shielding mask, and ultraviolet light is applied for exposure. Next, the substrate is immersed in developer to remove the resist film 130 in a region in which the plating film 120 is to be removed, and thus the plating film 120 is exposed. FIGS. 23A to 23C illustrate the surfaces of the piezoelectric material substrate 101 on which the pattern of the resist film 130 is formed by the exposure and development (FIG. 9 of Japanese Patent Application Laid-open No. 2002-172789). FIG. 23A illustrates a front end surface of the piezoelectric material substrate 101. The resist film 130 on the entire front end surface is removed by the exposure and development, and the plating film 120 is exposed at the entire front end surface. FIG. 23B illustrates a rear end surface of the piezoelectric material substrate 101. The plating film 120 on the rear end surface of each of the drive walls 103 is exposed in a vertical direction. FIG. 23C illustrates a bottom surface of the piezoelectric material substrate 101. The plating film 120 is exposed continuously to each plating film 120 exposed on the rear end surface. Next, etching treatment is performed to remove the exposed plating film 120.

FIGS. 24A to 24C illustrate the surfaces of the piezoelectric material substrate 101 after the etching treatment, and correspond to FIGS. 23A to 23C, respectively. The plating film 120 is removed from the front end surface of the piezoelectric material substrate 101 to expose the piezoelectric material substrate 101, and an electrode 104 remains on the side surface of the drive wall 103 (FIG. 24A). On the rear end surface of the piezoelectric material substrate 101, there is formed an electrode pattern 150 which is electrically isolated by portions 140 obtained by removing the plating film 120 (FIG. 24B). On the back surface of the piezoelectric material substrate 101, the electrode pattern 150 is formed, which is electrically connected to the electrode pattern 150 formed on the rear end surface (FIG. 24C). Next, a cover member (not shown) is bonded to the top surface of the piezoelectric material substrate 101 so as to close the respective grooves, and a nozzle plate is adhered to the surface of the piezoelectric material substrate 101 on the front side, from which the plating film 120 is removed. Further, a flexible printed board is bonded to the bottom surface of the piezoelectric material substrate 101 via an anisotropic conductive film, thereby electrically connecting wiring on the flexible printed board and the electrode pattern 150 on the bottom surface to each other.

When the electrode is formed through immersion into the plating liquid, in order to ensure the adhesiveness between the piezoelectric material substrate 101 and the plating film 120, pretreatment is required for the surface of the piezoelectric material substrate 101 before plating treatment is performed. However, the resist film has no resistance with respect to pretreatment liquid, and thus the resist film 130 dissolves and peels off due to the pretreatment liquid. Therefore, as described in Japanese Patent Application Laid-open No. 2002-172789, it is difficult to uniformly remove the plating film 120 from the upper surfaces of the drive walls 103.

In view of this, it is conceivable to deposit the conductive film by a vapor deposition method without using an electroless plating method as described above, and form the electrode pattern by a lift-off method. However, in recent years, the pitches are becoming narrower and the groove width of the channel portion 102 is becoming smaller. A metal vapor cannot easily enter a narrow groove at the time of vapor deposition, and it is required to perform the vapor deposition for a long period of time to form the drive electrode having a necessary thickness on the wall surface. Therefore, a thick metal film is deposited on the upper end surface of the drive wall 103, and thus removal by the lift-off method becomes difficult.

Further, in Japanese Patent Application Laid-open No. 2002-172789, the resist film 130 is formed on the plating film 120, the light shielding mask is placed separately on each of the rear end surface and the bottom surface of the piezoelectric material substrate 101 for exposure and development, and then the plating film 120 is etched to form a pattern. Therefore, the manufacturing process is long, and a large amount of time is required for electrode pattern formation.

Further, another conceivable method is to form a pattern of the plating film 120 by laser processing without using a lift-off method, photolithography, and an etching method. However, in the laser processing, the electrode pattern is required to be processed line by line, which still requires a large amount of time for electrode pattern formation.

SUMMARY OF THE INVENTION

The present invention has been made in view of the above-mentioned problems, and therefore has an object to provide a liquid jet head and a method of manufacturing the same, in which a pattern of a metal film can be formed without using a photosensitive resin such as a resist.

According to an exemplary embodiment of the present invention, there is provided a method of manufacturing a liquid jet head, including: determining a terminal region on a top surface of an actuator substrate in vicinity of a rear end thereof; forming a plurality of ejection grooves, which are arranged in parallel to each other and in a direction from a front end toward the terminal region of the top surface; forming a shallow groove in the terminal region; forming a conductive film on the top surface, a side surface and a bottom surface of each of the plurality of ejection grooves, and a side surface and a bottom surface of the shallow groove; grinding and removing the conductive film formed on the top surface; bonding a cover plate on the top surface while exposing the terminal region and covering the plurality of ejection grooves; and adhering a nozzle plate on a side surface of the actuator substrate, at which the plurality of ejection grooves are opened.

Further, in the method of manufacturing a liquid jet head, the forming a shallow groove includes: forming a first shallow groove between corresponding one of the plurality of ejection grooves and the terminal region, the first shallow groove being continuous to the corresponding one of the plurality of ejection grooves; and forming a second shallow groove, which is continuous to the first shallow groove, in the terminal region.

Further, in the method of manufacturing a liquid jet head, the forming a plurality of ejection grooves includes forming a dummy groove between adjacent two of the plurality of ejection grooves in parallel to the plurality of ejection grooves across the actuator substrate from the front end to the rear end, the forming a shallow groove includes: forming the second shallow groove in a direction intersecting with the dummy groove; and forming a third shallow groove in parallel to the second shallow groove on the rear end side with respect to the second shallow groove, and the method further includes chamfering a corner portion between a side surface of the dummy groove and a side surface and a bottom surface of the second shallow groove at an intersecting portion at which the second shallow groove and the dummy groove intersect with each other.

Further, the method of manufacturing a liquid jet head further includes: grinding a back surface of the actuator substrate on a side opposite to the top surface, to thereby remove the conductive film formed on a bottom surface of the dummy groove; and bonding a base substrate to the back surface.

Further, the method of manufacturing a liquid jet head further includes adhering a flexible substrate having common wiring and individual wiring formed thereon to the terminal region in a manner that the common wiring and the conductive film formed on the bottom surface of the second shallow groove are electrically connected to each other and that the individual wiring and the conductive film formed on a bottom surface of the third shallow groove are electrically connected to each other.

Further, in the method of manufacturing a liquid jet head, the forming a plurality of ejection grooves includes: forming the plurality of ejection grooves across the actuator substrate from the front end to the rear end; and forming a dummy groove between adjacent two of the plurality of ejection grooves in parallel to the plurality of ejection grooves across the actuator substrate from the front end to the rear end, the forming a shallow groove includes: forming a second shallow groove in the terminal region in a direction intersecting with the plurality of ejection grooves; and forming a third shallow groove in parallel to the second shallow groove on the rear end side with respect to the second shallow groove, and the method further includes chamfering a corner portion between a side surface of the dummy groove and a side surface and a bottom surface of the second shallow groove at an intersecting portion at which the second shallow groove and the dummy groove intersect with each other and a corner portion between a side surface of each of the plurality of ejection grooves and a side surface and a bottom surface of the third shallow groove at an intersecting portion at which the third shallow groove and the each of the plurality of ejection grooves intersect with each other.

Further, the method of manufacturing a liquid jet head further includes: grinding a back surface of the actuator substrate on a side opposite to the top surface, to thereby remove the conductive film formed on a bottom surface of the dummy groove; and bonding a base substrate to the back surface.

Further, the method of manufacturing a liquid jet head further includes adhering a flexible substrate having common wiring and individual wiring formed thereon to the terminal region in a manner that the common wiring and the conductive film formed on the bottom surface of the second shallow groove are electrically connected to each other and that the individual wiring and the conductive film formed on the bottom surface of the third shallow groove are electrically connected to each other.

Further, in the method of manufacturing a liquid jet head, the forming a conductive film includes forming the conductive film by a plating method.

According to another exemplary embodiment of the present invention, there is provided a liquid jet head, including: an actuator substrate having a terminal region determined in vicinity of a rear end on a top surface thereof, the actuator substrate including a plurality of ejection grooves, which are arranged in parallel to each other and in a direction from a front end toward the terminal region of the top surface, the plurality of ejection grooves each having a drive electrode formed on a side surface thereof; a cover plate bonded to the top surface of the actuator substrate while covering the plurality of ejection grooves and exposing the terminal region; a nozzle plate adhered to a side surface of the actuator substrate, at which the plurality of ejection grooves are opened; and a flexible substrate which includes a wiring electrode and is adhered to the terminal region, in which the top surface has a first shallow groove formed therein between corresponding one of the plurality of ejection grooves and the terminal region, in which the terminal region has a second shallow groove formed therein, the second shallow groove having a depth different from a depth of the first shallow groove, in which the first shallow groove and the second shallow groove each have a conductive film formed on a side surface and a bottom surface thereof, the conductive film being electrically connected to the drive electrode, and in which the conductive film and the wiring electrode are electrically connected to each other.

Further, according to another exemplary embodiment of the present invention, there is provided a liquid jet head, including: an actuator substrate having a terminal region determined in vicinity of a rear end on a top surface thereof, the actuator substrate including: a plurality of ejection grooves which are arranged in parallel to each other and in a direction from a front end toward the terminal region of the top surface; and a dummy groove formed between adjacent two of the plurality of ejection grooves in parallel to the plurality of ejection grooves across the actuator substrate from the front end to the rear end, the plurality of ejection grooves and the dummy groove each having a drive electrode formed on a side surface thereof; a base substrate bonded to a back surface of the actuator substrate on a side opposite to the cover plate; a cover plate bonded to the top surface of the actuator substrate while covering the plurality of ejection grooves and exposing the terminal region; a nozzle plate adhered to a side surface of the actuator substrate, at which the plurality of ejection grooves are opened; and a flexible substrate which includes a wiring electrode and is adhered to the terminal region, in which the terminal region has a shallow groove formed therein, in which the shallow groove has a conductive film formed on a side surface and a bottom surface thereof, the conductive film being electrically connected to the drive electrode, and in which the conductive film and the wiring electrode are electrically connected to each other.

Further, in the liquid jet head, the base substrate is exposed at a bottom surface of the dummy groove.

Further, in the liquid jet head, the top surface has a first shallow groove formed therein between corresponding one of the plurality of ejection grooves and the terminal region, and the shallow groove includes a second shallow groove formed in the terminal region and continuous to the first shallow groove.

Further, in the liquid jet head, the shallow groove further includes a third shallow groove, the second shallow groove is formed in a direction intersecting with the dummy groove, the third shallow groove is formed in parallel to the second shallow groove on the rear end side with respect to the second shallow groove, and the conductive film is removed by chamfering at a corner portion between the side surface of the dummy groove and a side surface and a bottom surface of the second shallow groove at an intersecting portion at which the second shallow groove and the dummy groove intersect with each other.

Further, in the liquid jet head, the wiring electrode includes common wiring and individual wiring, the conductive film formed on the bottom surface of the second shallow groove is electrically connected to the common wiring, and the conductive film formed on a bottom surface of the third shallow groove is electrically connected to the individual wiring.

Further, in the liquid jet head, the shallow groove includes a second shallow groove and a third shallow groove, the plurality of ejection grooves are each formed across the actuator substrate from the front end to the rear end, the second shallow groove is formed in a direction intersecting with the plurality of ejection grooves, the third shallow groove is formed in parallel to the second shallow groove on the rear end side with respect to the second shallow groove, and the conductive film is removed by chamfering at a corner portion between a side surface of the dummy groove and a side surface and a bottom surface of the second shallow groove at an intersecting portion at which the second shallow groove and the dummy groove intersect with each other, and at a corner portion between a side surface of each of the plurality of ejection grooves and a side surface and a bottom surface of the third shallow groove at an intersecting portion at which the third shallow groove and the each of the plurality of ejection grooves intersect with each other.

Further, in the liquid jet head, the wiring electrode includes common wiring and individual wiring, the conductive film formed on the bottom surface of the second shallow groove is electrically connected to the common wiring, and the conductive film formed on the bottom surface of the third shallow groove is electrically connected to the individual wiring.

According to another exemplary embodiment of the present invention, there is provided a liquid jet apparatus, including: the above-mentioned liquid jet head; a moving mechanism for reciprocating the liquid jet head; a liquid supply tube for supplying liquid to the liquid jet head; and a liquid tank for supplying the liquid to the liquid supply tube.

The method of manufacturing a liquid jet head according to the present invention includes: determining the terminal region on the top surface of the actuator substrate in vicinity of the rear end thereof; forming the plurality of ejection grooves, which are arranged in parallel to each other and in a direction from the front end toward the terminal region of the top surface; forming the shallow groove in the terminal region; forming the conductive film on the top surface, the side surface and the bottom surface of each of the plurality of ejection grooves, and the side surface and the bottom surface of the shallow groove; grinding and removing the conductive film formed on the top surface; bonding the cover plate on the top surface while exposing the terminal region and covering the plurality of ejection grooves; and adhering the nozzle plate on the side surface of the actuator substrate, at which the plurality of ejection grooves are opened. In other words, the conductive film is processed into the electrode pattern by a grinding method, and hence the liquid jet head can be manufactured by a simpler method with the reduced number of manufacturing steps.

DETAILED DESCRIPTION OF THE PREFERRED EMBODIMENTS (First Embodiment)

Figure 1A:
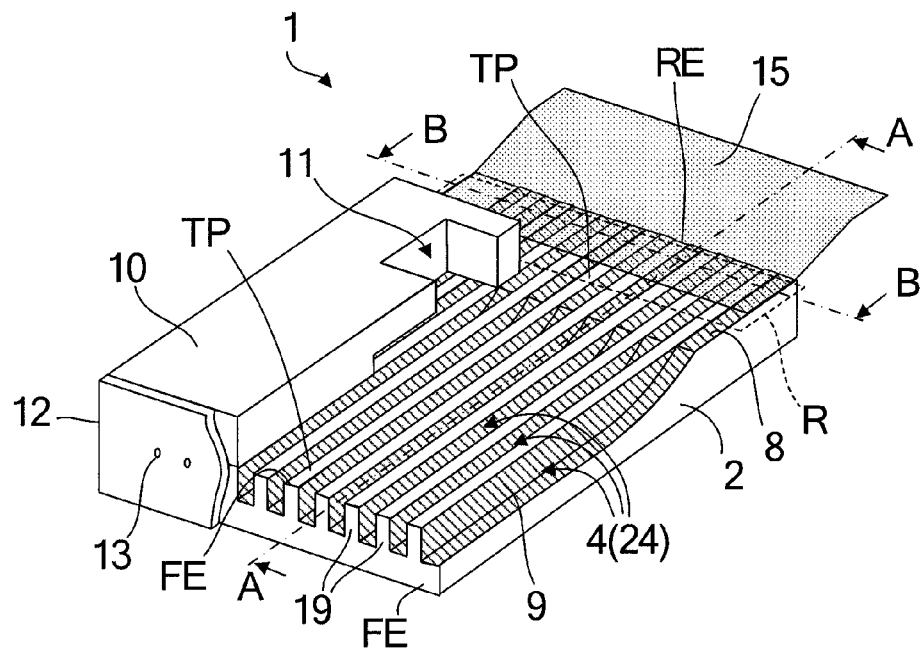
FIGS. 1A to 1C are explanatory views illustrating a liquid jet head according to a first embodiment of the present invention.
Figure 1B:
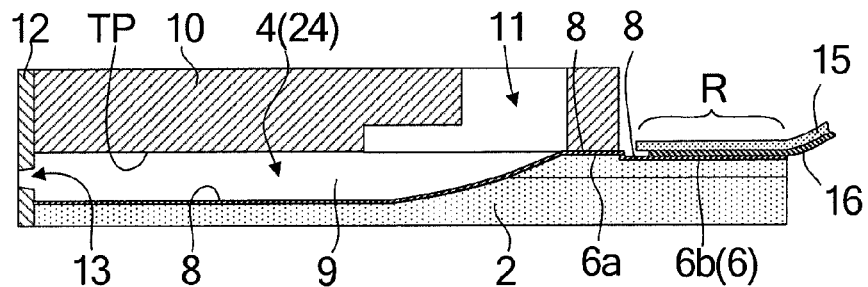
Figure 1C:
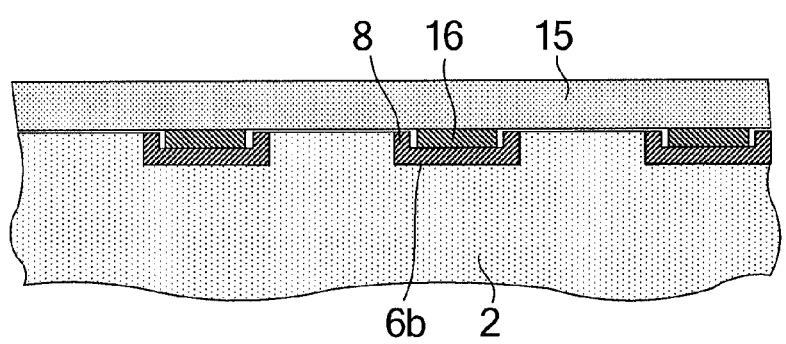
Figure 2:
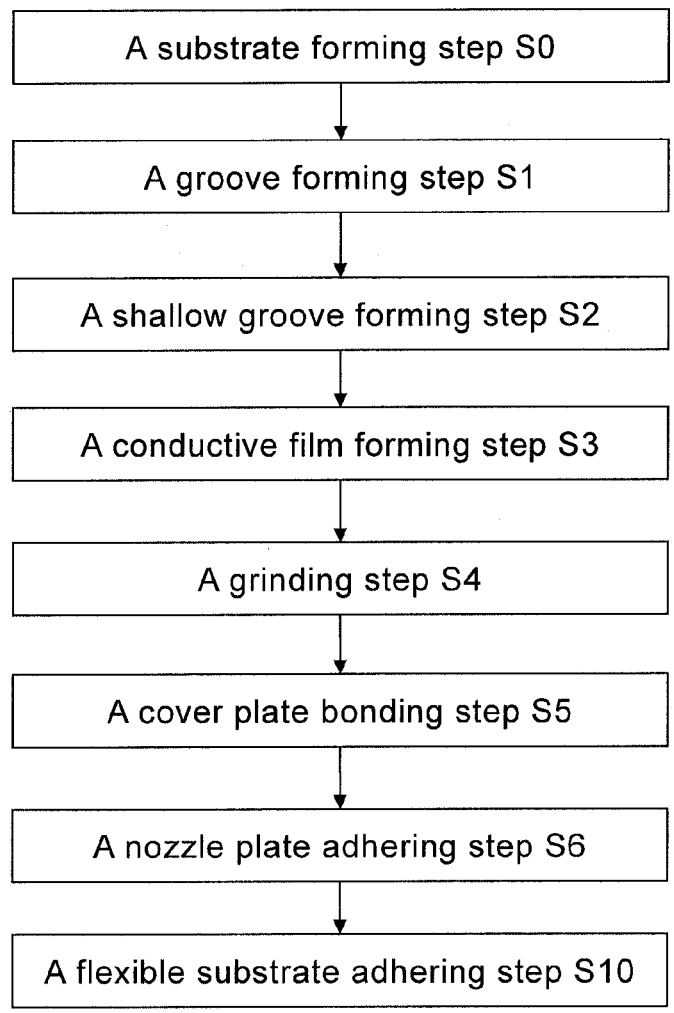
FIG. 2 is a flow chart illustrating a method of manufacturing the liquid jet head according to the first embodiment of the present invention.

FIGS. 1A to 7C illustrate a liquid jet head and a method of manufacturing the same according to a first embodiment of the present invention. FIGS. 1A to 1C are explanatory views of a liquid jet head 1, FIG. 2 is a flow chart illustrating a method of manufacturing the liquid jet head 1, and FIGS. 3 to 7C illustrate steps for manufacturing the liquid jet head 1.

FIG. 1A is a schematic exploded perspective view of the liquid jet head 1, FIG. 1B is a schematic sectional view taken along the line AA of FIG. 1A, and FIG. 1C is a schematic partial sectional view taken along the line BB of FIG. 1A. FIGS. 1B and 1C are views each seen from the arrow direction. As illustrated in FIGS. 1A to 1C, the liquid jet head 1 includes an actuator substrate 2 containing a piezoelectric material, a cover plate 10 bonded to a top surface TP of the actuator substrate 2, a nozzle plate 12 adhered to front ends FE of the actuator substrate 2 and the cover plate 10, and a flexible substrate 15 adhered to a terminal region R determined on the top surface TP of the actuator substrate 2 in the vicinity of a rear end RE.

The actuator substrate 2 has a structure in which two piezoelectric substrates are laminated, the two piezoelectric substrates being polarized in a direction perpendicular to the substrate surface and having polarization directions which are opposite to each other. In the actuator substrate 2, the terminal region R is determined on the top surface TP in the vicinity of the rear end RE, a plurality of ejection grooves 4, which are arranged parallel to each other, are formed in a direction from the front end FE toward the terminal region R of the top surface TP, and drive electrodes 9 are formed on side surfaces of the respective ejection grooves 4. The cover plate 10 is bonded to the top surface TP of the actuator substrate 2 while covering the plurality of ejection grooves 4 and exposing the terminal region R. An upper opening of each of the ejection grooves 4 is closed by the cover plate 10 to form a channel 24. A liquid supply chamber 11 is formed on the rear side of the cover plate 10, and the liquid supply chamber 11 communicates to the respective channels 24 to enable liquid supply. The nozzle plate 12 is adhered to a side surface of the actuator substrate 2, at which the ejection grooves 4 are opened. Nozzles 13 are formed in the nozzle plate 12, which communicate to the respective ejection grooves 4 (channels 24) opened at the side surface of the actuator substrate 2.

Figure 10:
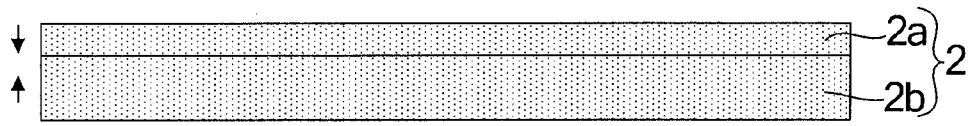
FIG. 10 illustrates a step for manufacturing the liquid jet head according to the second embodiment of the present invention.

As illustrated in FIGS. 1B and 10, the ejection groove 4 is formed at a constant depth from the front end FE to the middle of the groove, and is formed to be gradually shallower from the middle of the groove. In a region between an end portion of the ejection groove 4 on the rear end RE side and the terminal region R, there is formed a first shallow groove 6a continuous to the ejection groove 4. Further, in the terminal region R, there is formed the first shallow groove 6a and a second shallow groove 6b having a depth different from that of the first shallow groove 6a. On a side surface and a bottom surface of each of the first shallow groove 6a and the second shallow groove 6b, a conductive film 8 is formed, which is continuous and electrically connected to the drive electrode 9 formed on the side surface of the ejection groove 4 and the conductive film 8 formed on the bottom surface of the ejection groove 4. On the actuator substrate 2 side of the flexible substrate 15, a wiring electrode 16 is formed at a position corresponding to each second shallow groove 6b. The flexible substrate 15 is adhered to the terminal region R via an anisotropic conductive film (not shown). With this, the wiring electrode 16 is electrically connected to the drive electrode 9 via the conductive films 8 on the first and second shallow grooves 6a and 6b.

The liquid jet head 1 is driven as follows. Liquid is supplied from a liquid tank (not shown) to the liquid supply chamber 11, and further supplied to each of the ejection grooves 4. When a drive signal is transmitted from the wiring electrode 16 of the flexible substrate 15 to the drive electrode 9, thickness slip deformation is caused on side walls 19 on both sides of the ejection groove 4. Thus, the volume of the channel 24 sandwiched by both the side walls 19 instantaneously increases, and then decreases. With this, the liquid is drawn from the liquid supply chamber 11 to the channels 24 to be ejected as liquid droplets from the nozzles 13. In the case illustrated in FIGS. 1A to 1C, three-cycle driving is performed so that liquid droplets are sequentially ejected from the respective ejection grooves 4.

In this case, as the actuator substrate 2, a piezoelectric ceramic substrate made of lead zirconate titanate (PZT) can be used. Two piezoelectric ceramic substrates are subjected to polarization treatment in the direction perpendicular to the plate surface in advance, and are bonded to each other so that their polarization directions are opposite to each other, to thereby form the actuator substrate 2. The conductive film 8 can be formed to have a thickness of 0.1 μm to 5 μm by a sputtering method, a vapor deposition method, or an electroless plating method. When Ni—P is formed by the electroless plating method and Au is further laminated thereon, the conductive film 8 can be formed at low cost and in a short period of time. The ejection groove 4, the first shallow groove 6a, and the second shallow groove 6b can be continuously formed by using a dicing blade (diamond wheel) in which diamond is embedded at an outer peripheral end portion thereof. The cover plate 10 to be used is made of a material having a linear expansion coefficient close to that of the actuator substrate 2. For example, the same lead zirconate titanate ceramics as the actuator substrate 2 can be used. As the nozzle plate 12, a polyimide film can be used.

The depth of the ejection groove 4 is 300 μm to 400 μm, and the width of the ejection groove 4 and the thickness of the side wall 19 are each 40 μm to 100 μm. The first shallow groove 6a and the second shallow groove 6b have different depths. For example, the first shallow groove 6a can be formed shallower than the second shallow groove 6b. The first shallow groove 6a is sealed when the cover plate 10 is bonded thereon via an adhesive. In this case, it is desired that a gap between the upper surface of the conductive film 8 formed on the bottom surface of the first shallow groove 6a and the surface of the cover plate 10 on the actuator substrate 2 side be small. This is for preventing the liquid to be supplied to the ejection groove 4 from accumulating in the first shallow groove 6a. On the other hand, the flexible substrate 15 can be firmly adhered by causing the wiring electrode 16 to fit to the second shallow groove 6b via the anisotropic conductive film. Therefore, it is preferred that the second shallow groove 6b be formed deeper than the first shallow groove 6a.

Note that, the first shallow groove 6a can be formed deeper than the second shallow groove 6b. In this case, it is only required to sufficiently supply an adhesive between the first shallow groove 6a and the cover plate 10 to seal a region between the cover plate 10 and the upper surface of the conductive film 8 formed on the bottom surface of the first shallow groove 6a. Further, as necessary, a sealing material may be molded at a corner portion between the actuator substrate 2 and the rear end of the cover plate 10 to completely seal the first shallow groove 6a. The first shallow groove 6a and the second shallow groove 6b are each set to have a depth of 0.1 μm to 30 μm, and the grooves are each set to have the same groove width as the ejection groove 4.

As described above, it is only required that the second shallow groove 6b be formed in the terminal region R of the top surface TP of the actuator substrate 2, and the conductive film 8 be formed in the second shallow groove 6b and the ejection groove 4. In this manner, the liquid jet head 1 can be formed by a simple method.

With reference to FIG. 2, description is made of the method of manufacturing the liquid jet head 1 according to the first embodiment of the present invention. As illustrated in FIG. 2, first, in a substrate forming step S0, the actuator substrate 2 containing a piezoelectric material is formed. Next, in a groove forming step S1, the terminal region R is determined on the top surface TP of the actuator substrate 2 in the vicinity of the rear end RE, and the plurality of ejection grooves 4 arranged in parallel to each other are formed in the direction from the front end FE toward the terminal region R of the top surface TP. Next, in a shallow groove forming step S2, the first shallow groove 6a communicating to the ejection groove 4 is formed in the terminal region R of the actuator substrate 2. Next, in a conductive film forming step S3, the conductive film is formed on the top surface TP of the actuator substrate 2 and the side surface and the bottom surface of each of the ejection groove 4 and the first shallow groove 6a. Note that, when the conductive film is formed by an electroless plating method, film formation can be performed at low cost and in a short period of time, and hence this method is particularly effective.

Next, in a grinding step S4, the conductive film 8 formed on the top surface TP of the actuator substrate 2 is ground to be removed. With this, a conductive pattern is formed on the top surface TP of the actuator substrate 2. Next, in a cover plate bonding step S5, the cover plate 10 is bonded to the top surface TP while exposing the terminal region R of the actuator substrate 2 and covering the ejection grooves 4. Next, in a nozzle plate adhering step S6, the nozzle plate 12 is adhered to the side surface of the actuator substrate 2, at which the ejection grooves 4 are opened. Next, in a flexible substrate adhering step S10, the flexible substrate 15 having the wiring electrode 16 formed thereon is adhered to the terminal region R in a manner that the wiring electrode 16 is electrically connected to the conductive film 8 formed on the bottom surface of the second shallow groove 6b.

As described above, in the method of manufacturing the liquid jet head 1 of the present invention, instead of applying a photosensitive resin before or after the conductive film is formed, and, after the pattern of the photosensitive resin is formed, forming the pattern of the conductive film by a lift-off method or an etching method, the shallow groove is formed in the top surface of the actuator substrate 2, and then, after the conductive film is formed on the entire surface, the substrate surface is ground to leave the pattern of the conductive film accumulated in the shallow groove. Therefore, the number of steps for forming the pattern is reduced, and the pattern of the conductive film can be formed without the need to repeatedly perform a complicated photo-process including application of the resist film, development, exposure, and etching.

In the following, specific description is made with reference to FIGS. 3 to 7C. In the following, the same parts or parts having the same functions are denoted by the same reference symbols.

Figure 3:
FIG. 3 illustrates a step for manufacturing the liquid jet head according to the first embodiment of the present invention.

FIG. 3 is a schematic sectional view of the actuator substrate 2, which illustrates the substrate forming step S0. In the substrate forming step S0, a piezoelectric substrate 2a subjected to polarization treatment in a direction perpendicular to the substrate surface and a piezoelectric substrate 2b subjected to polarization treatment in the opposite direction are bonded to each other with an adhesive to form the actuator substrate 2. The piezoelectric substrate 2b is formed thicker than the piezoelectric substrate 2a so that, when the ejection groove 4 is formed, the boundary between the piezoelectric substrate 2a and the piezoelectric substrate 2b comes to an intermediate position of the depth of the groove. As the actuator substrate 2, PZT ceramics is used, but other piezoelectric substrates made of, for example, barium titanate instead of PZT ceramics may be used. Further, the actuator substrate 2 may be formed by forming a laminate of the piezoelectric substrates 2a and 2b in a necessary region on an insulator substrate.

Figure 4A:
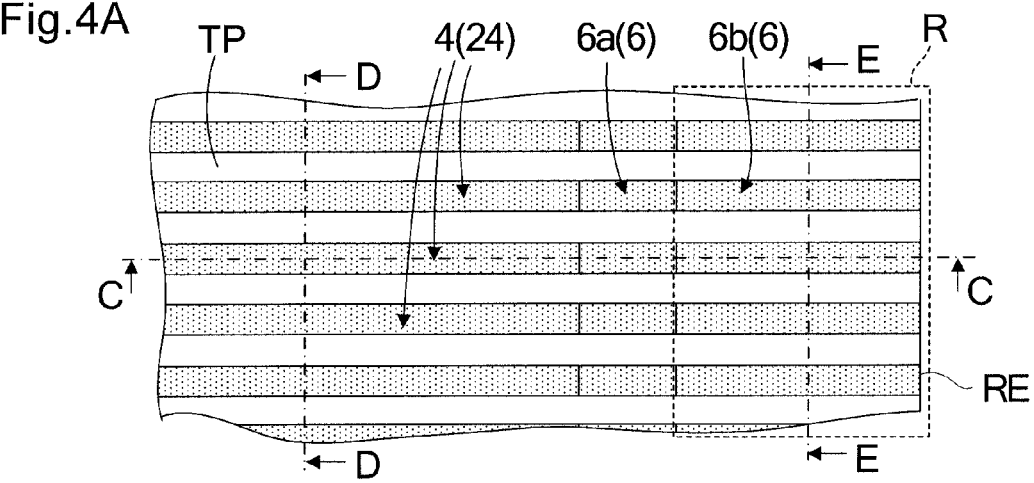
FIGS. 4A to 4D illustrate a step for manufacturing the liquid jet head according to the first embodiment of the present invention.
Figure 4B:
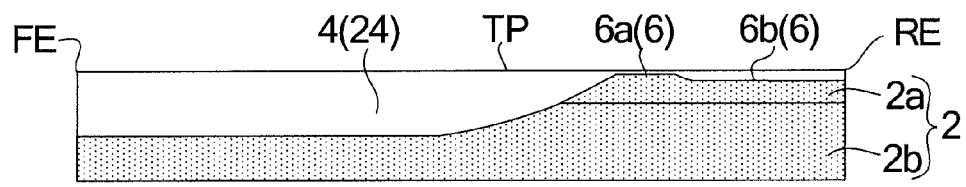
Figure 4C:
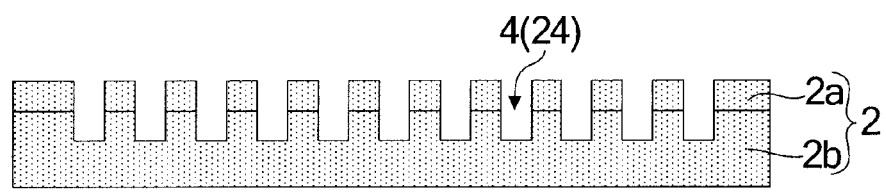
Figure 4D:
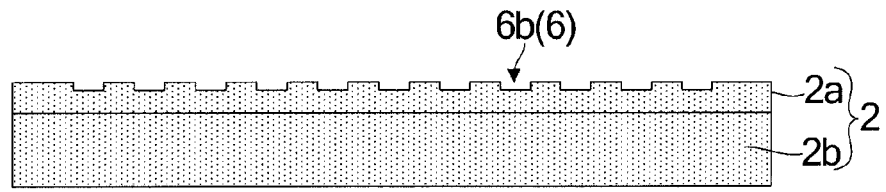

FIGS. 4A to 4D illustrate the groove forming step S1 and the shallow groove forming step S2. FIG. 4A is a schematic plan view of a part of the actuator substrate 2, FIG. 4B is a schematic sectional view taken along the line CC of FIG. 4A, FIG. 4C is a schematic sectional view taken along the line DD of FIG. 4A, and FIG. 4D is a schematic sectional view taken along the line EE of FIG. 4A. As illustrated in FIGS. 4A and 4B, in the groove forming step S1, the ejection groove 4 is formed in the top surface TP of the actuator substrate 2, and subsequently in the shallow groove forming step S2, the first shallow groove 6a continuous to the ejection groove 4 and the second shallow groove 6b deeper than the first shallow groove 6a are formed.

The ejection groove 4 is formed with use of the dicing blade in the top surface TP of the actuator substrate 2 from the front end FE up to just in front of the terminal region R. The dicing blade has a disk shape, and hence as illustrated in FIG. 4B, the end portion of the ejection groove 4 on the rear end RE side becomes an arc shape. After the ejection groove 4 is formed, the dicing blade is raised to form the first shallow groove 6a, and then the second shallow groove 6b is formed continuous to the first shallow groove 6a. In the subsequent grinding step, the top surface TP is ground, and hence the final shapes of the ejection groove 4 and the first and second shallow grooves 6a and 6b become shallower than the depths obtained by grinding in the groove forming step S1 and the shallow groove forming step S2. Therefore, in the shallow groove forming step, it is desired that the grooves be formed deeper than those to be obtained as the final shapes. The ejection groove 4 is formed to have a depth of 300 µm to 400 µm and a width of 40 µm to 100 µm. The first shallow groove 6a is formed continuous to the ejection groove 4 to have a depth of 10 µm to 40 µm and the same width as the ejection groove 4. The second shallow groove 6b is formed continuous to the first shallow groove 6a to have a depth of 30 µm to 40 µm and the same width as the first shallow groove 6a. As illustrated in FIG. 4C, the ejection groove 4 has a constant depth in a region in which the channel 24 is formed. As illustrated in FIG. 4D, the second shallow groove 6b formed in the terminal region R is formed as a shallow groove 6 in the top surface TP of the piezoelectric substrate 2a. Note that, as already described above, the first shallow groove 6a may be formed deeper than the second shallow groove 6b, or the grooves can be formed into the same depth.

Figure 5A:
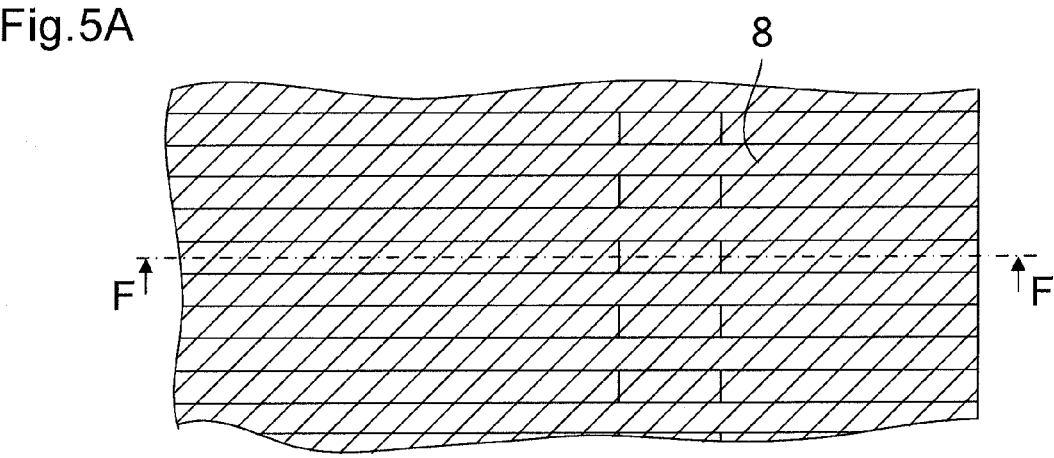
FIGS. 5A and 5B illustrate a step for manufacturing the liquid jet head according to the first embodiment of the present invention.
Figure 5B:
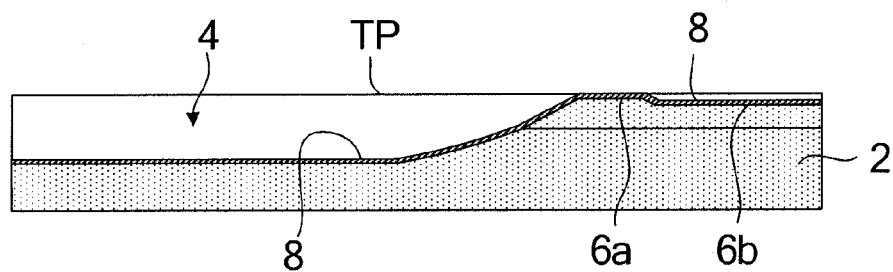

FIGS. 5A and 5B illustrate the conductive film forming step S3. FIG. 5A is a schematic plan view illustrating a part of the actuator substrate 2, and FIG. 5B is a schematic sectional view taken along the line FF of FIG. 5A. In the conductive film forming step S3, the conductive film 8 is formed on the top surface TP of the actuator substrate 2 and the side surface and the bottom surface of each of the ejection groove 4, the first shallow groove 6a, and the second shallow groove 6b by an electroless plating method. First, the top surface of the actuator substrate 2 is subjected to plating pretreatment. Next, by an electroless plating method, Ni—P is precipitated on the top surface, and then Au is precipitated. Thus, the conductive film 8 made of Au/Ni—P is formed. The conductive film 8 is formed into a thickness of 0.1 µm to 5 µm. Through the plating pretreatment, the adhesiveness of the conductive film 8 can be improved.

Figure 6A:
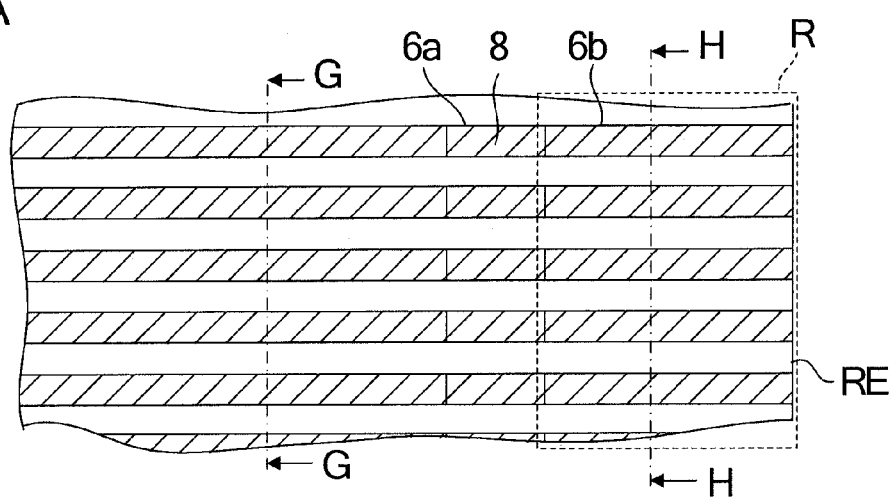
FIGS. 6A to 6C illustrate a step for manufacturing the liquid jet head according to the first embodiment of the present invention.
Figure 6B:
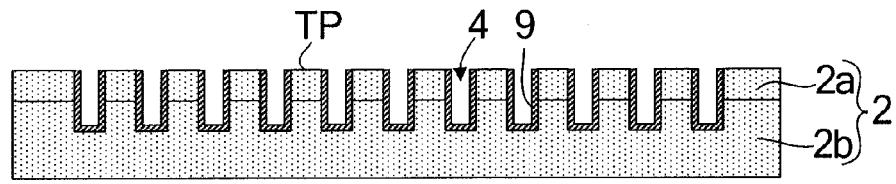
Figure 6C:
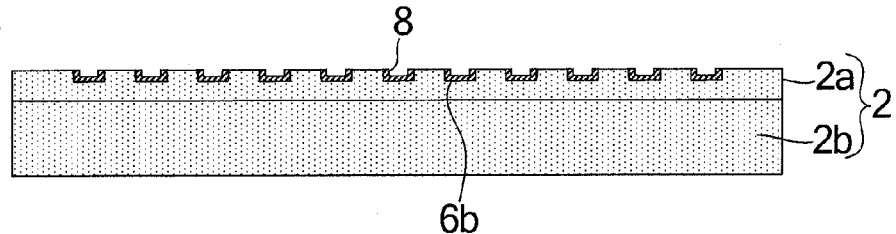

FIGS. 6A to 6C illustrate the grinding step S4. FIG. 6A is a schematic plan view illustrating a part of the actuator substrate 2, FIG. 6B is a schematic sectional view taken along the line GG of FIG. 6A, and FIG. 6C is a schematic sectional view taken along the line HH of FIG. 6A. As illustrated in FIG. 6A, in the grinding step S4, the conductive film 8 deposited on the top surface TP of the actuator substrate 2 is ground and removed, and thus the pattern of the conductive film 8 is formed on the top surface TP. The grinding is performed with use of, for example, a grinding blade having a large width, and the conductive film 8 and the surface layer of the top surface TP are removed. Next, a polishing surface plate is used to planarize the top surface TP. In this manner, as illustrated in FIGS. 6B and 6C, the conductive film 8 remains on the bottom surface and the side surface of the ejection groove 4 and the bottom surface and the side surface of each of the first and second shallow grooves 6a and 6b. The conductive film 8 deposited on the side wall of the ejection groove 4 becomes the drive electrode 9.

The conductive film 8 on the second shallow groove 6b functions as a terminal for connection to the external circuit. The conductive film 8 on each second shallow groove 6b is electrically connected to the drive electrode 9 of the corresponding ejection groove 4.

Figure 7A:
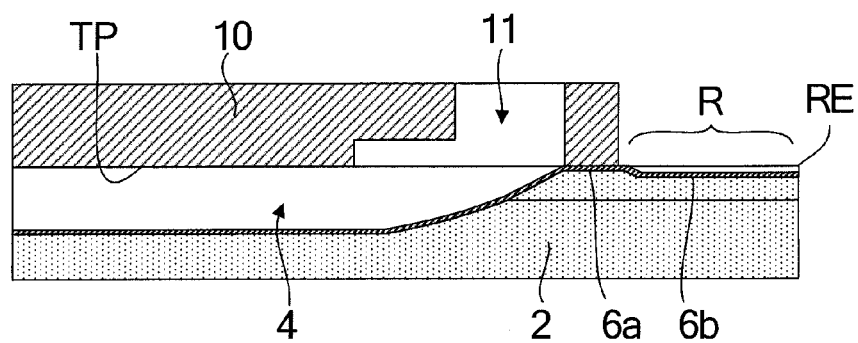
FIGS. 7A to 7C illustrate steps for manufacturing the liquid jet head according to the first embodiment of the present invention.

FIG. 7A is a schematic sectional view illustrating a state in which, in the cover plate bonding step S5, the cover plate 10 is bonded to the top surface TP of the actuator substrate 2. The cover plate 10 is bonded to the top surface TP with an adhesive while exposing the terminal region R of the actuator substrate 2 and covering the ejection grooves 4. In the grinding step S4, the upper end surface of the conductive film 8 formed on the first shallow groove 6a is formed into substantially the same height as the top surface TP, and thus the cover plate 10 and the top surface TP can be bonded to each other in a flush manner. Even when the cover plate 10 and the top surface TP are not flush with each other, the cover plate 10 is bonded to the actuator substrate 2 via an adhesive, and hence the first shallow groove 6a is sealed with the adhesive. The liquid supply chamber 11 is formed in the cover plate 10, and the liquid supply chamber 11 communicates to the respective ejection grooves 4. Note that, after the cover plate 10 is bonded to the actuator substrate 2, a sealing material may be molded to a corner portion between the rear end of the cover plate 10 and the actuator substrate 2 to completely seal the first shallow groove 6a.

Figure 7B:
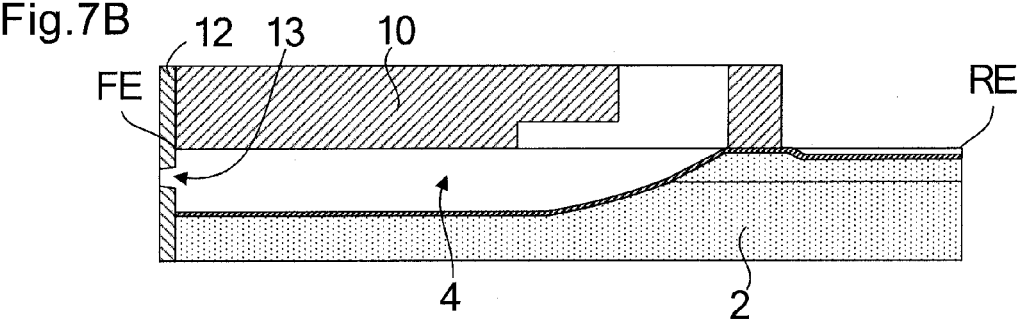
Figure 7C:
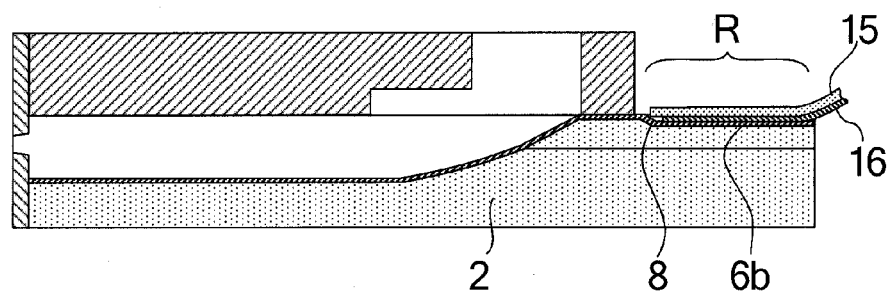

FIG. 7B is a schematic sectional view illustrating a state in which, in the nozzle plate adhering step S6, the nozzle plate 12 is adhered to, with an adhesive, the side surface of the actuator substrate 2 at the front end FE, at which the ejection grooves 4 are opened. The nozzle plate 12 is provided with the nozzles 13, and each of the nozzles 13 communicates to the ejection groove 4. FIG. 7C is a schematic sectional view illustrating a state in which the flexible substrate 15 is adhered to the terminal region R of the actuator substrate 2. The flexible substrate 15 has the wiring electrode 16 formed thereon, and the wiring electrode 16 is electrically connected to the conductive film 8 on the second shallow groove 6b via an anisotropic conductive film (not shown). The second shallow groove 6b is formed in the shallow groove forming step S2 so as to be shallower than the total thickness of the thickness of the conductive film 8 and the thickness of the wiring electrode 16. In this manner, the conductive film 8 and the wiring electrode 16 can be electrically connected to each other.

As described above, the first shallow groove 6a and the second shallow groove 6b are formed in the top surface TP of the actuator substrate 2, and the conductive film 8 is deposited on the first and second shallow grooves 6a and 6b by an electroless plating method. After that, the conductive film 8 on the top surface TP is removed to form the pattern of the conductive film 8. Therefore, the manufacturing process becomes short, and the electrode pattern can be formed simply without using photolithography and an etching method. Note that, in the conductive film forming step S3, the conductive film 8 is formed by an electroless plating method. However, the present invention is not limited thereto, and the conductive film 8 can be formed by a sputtering method or a vapor deposition method instead of the electroless plating method.

(Second Embodiment)

Figure 8A:
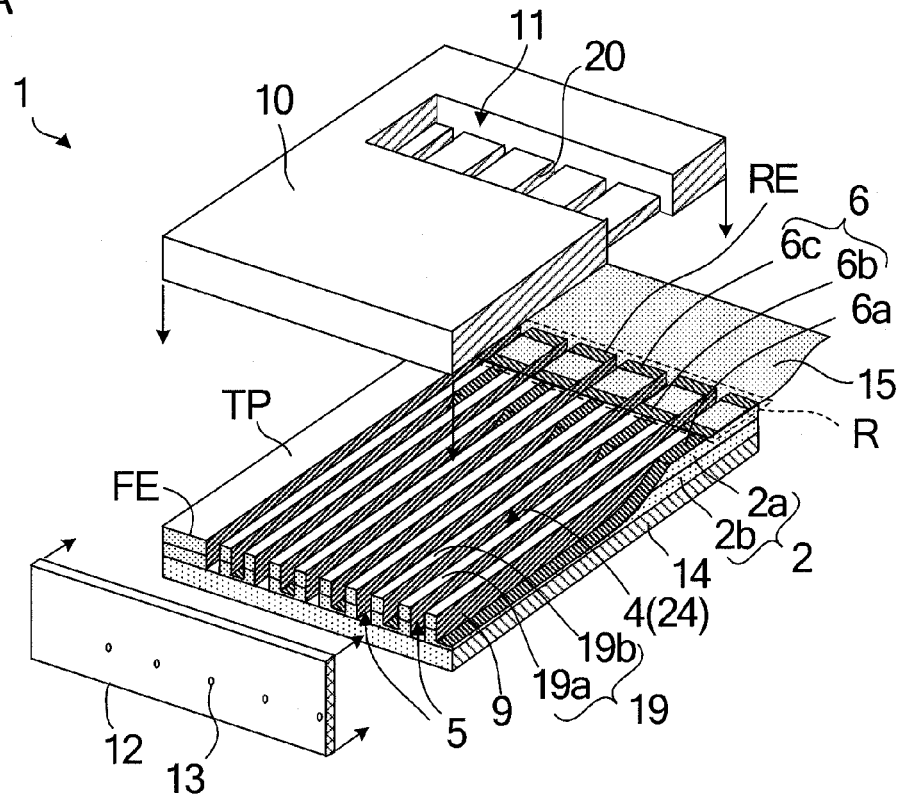
FIGS. 8A to 8C are explanatory views illustrating a liquid jet head according to a second embodiment of the present invention.
Figure 8B:
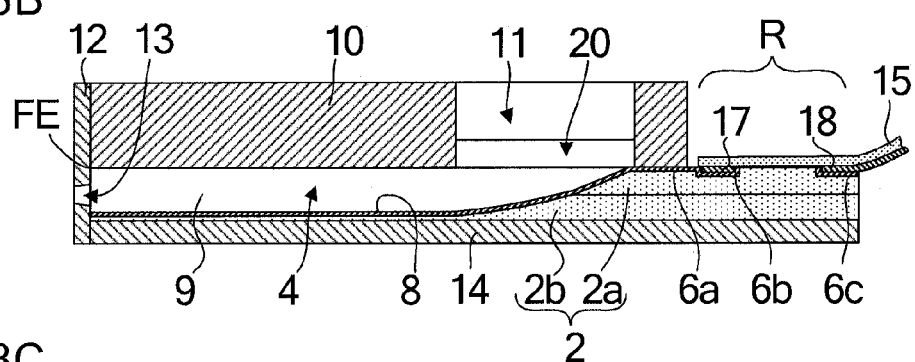
Figure 8C:
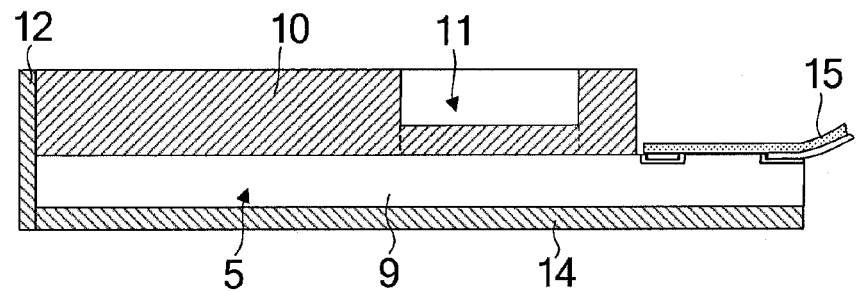
Figure 9:
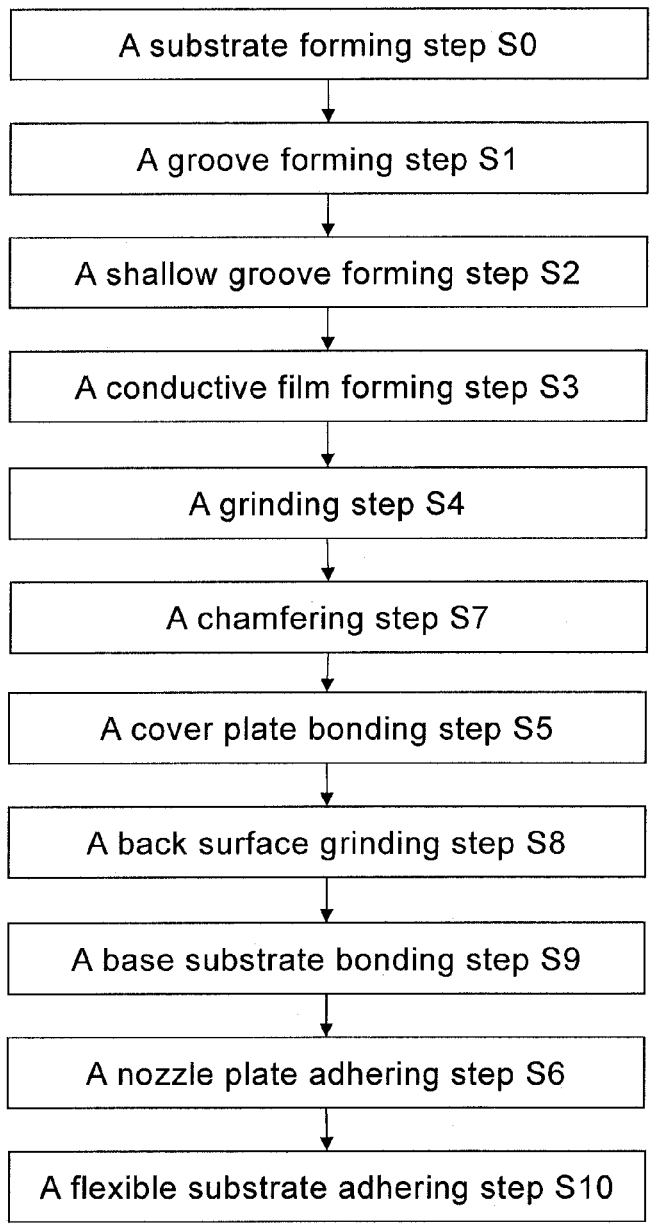
FIG. 9 is a flow chart illustrating a method of manufacturing the liquid jet head according to the second embodiment of the present invention.

FIGS. 8A to 17 illustrate a liquid jet head and a method of manufacturing the same according to a second embodiment of the present invention. FIGS. 8A to 8C are explanatory views of the liquid jet head 1, FIG. 9 is a flow chart illustrating a method of manufacturing the liquid jet head 1, and FIGS. 10 to 17 illustrate steps for manufacturing the liquid jet head 1. The same parts or parts having the same functions as the first embodiment are denoted by the same reference symbols.

FIG. 8A is a schematic exploded perspective view of the liquid jet head 1, FIG. 8B is a schematic sectional view taken along the longitudinal direction of the ejection groove 4, and FIG. 8C is a schematic sectional view taken along the longitudinal direction of a dummy groove 5. As illustrated in FIGS. 8A to 8C, the liquid jet head 1 includes the actuator substrate 2 containing the piezoelectric material, the cover plate 10 bonded to the top surface TP of the actuator substrate 2, the nozzle plate 12 adhered to the front side surfaces of the actuator substrate 2 and the cover plate 10, and the flexible substrate 15 adhered to the terminal region R of the top surface TP of the actuator substrate 2 in the vicinity of the rear end RE.

The actuator substrate 2 includes the two piezoelectric substrates 2a and 2b which are each made of a piezoelectric material and have polarization directions perpendicular to the substrate surface and directed opposite to each other. On the back surface of the actuator substrate 2 on a side opposite to the cover plate 10, a base substrate 14 is bonded. In the actuator substrate 2, the terminal region R is determined on the top surface TP in the vicinity of the rear end RE, and the plurality of ejection grooves 4 arranged in parallel to each other are formed in a direction from the front end FE toward the terminal region R of the top surface TP. Further, the dummy groove 5 is formed between adjacent ejection grooves 4 in parallel to the ejection grooves 4 across the actuator substrate 2 from the front end FE to the rear end RE. The drive electrode 9 is formed on the side surface of the ejection groove 4, and the conductive film 8 is formed on the bottom surface of the ejection groove 4. The drive electrode 9 is formed on the side surface of the dummy groove 5, and the base substrate 14 is exposed at the bottom surface of the dummy groove 5.

The cover plate 10 is bonded to the top surface TP of the actuator substrate 2 while covering the plurality of ejection grooves 4 and the plurality of dummy grooves 5 and exposing the terminal region R. The liquid supply chamber 11 is formed on the rear side of the cover plate 10, and the liquid supply chamber 11 is provided with slits 20 at positions corresponding to the ejection grooves 4. The upper opening of the ejection groove 4 is closed by the cover plate 10 to form the channel 24, and the channel 24 communicates to the liquid supply chamber 11 via the slit 20. The upper opening of the dummy groove 5 is closed by the cover plate 10 and does not communicate to the liquid supply chamber 11. The nozzle plate 12 is adhered to the front ends FE of the actuator substrate 2 and the cover plate 10. The nozzle plate 12 is provided with the nozzles 13, and each of the nozzles 13 communicates to the ejection groove 4 (channel 24) opened at the side surface of the actuator substrate 2 on the front side.

As illustrated in FIG. 8B, the ejection groove 4 is formed in the actuator substrate 2 from the front end FE up to just in front of the terminal region R. The end portion of the ejection groove 4 on the rear side has an arc shape obtained by transferring the outer shape of the dicing blade thereon. The first shallow groove 6a continuous to the ejection groove 4 is formed between the end portion of the ejection groove 4 on the rear side and the terminal region R. Further, in the terminal region R, the second shallow groove 6b and a third shallow groove 6c are formed. The second shallow groove 6b is continuous to the first shallow groove 6a and intersects with the dummy groove 5. The third shallow groove 6c is arranged parallel to the second shallow groove 6b on the rear end RE side with respect to the second shallow groove 6b. The first shallow groove 6a is formed to have a depth smaller than those of the second and third shallow grooves 6b and 6c.

Figure 14:
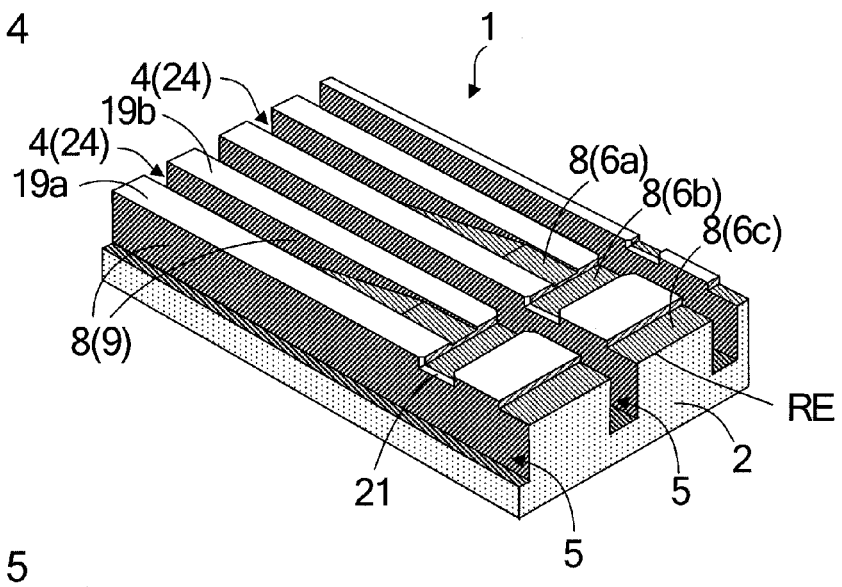
FIG. 14 illustrates a step for manufacturing the liquid jet head according to the second embodiment of the present invention.

FIG. 14 is a partial perspective view illustrating the actuator substrate 2 after a chamfering step described later. With reference to FIG. 14, description is made of configurations of the first to third shallow grooves 6a to 6c and the conductive film 8. The conductive film 8 is formed on the side surface and the bottom surface of each of the first to third shallow grooves 6a to 6c. The conductive film 8 formed on the bottom surface and the side surface of the second shallow groove 6b is electrically connected to the drive electrode 9 formed on the side surface of the ejection groove 4 via the conductive film 8 formed on the first shallow groove 6a. The conductive film 8 formed on the third shallow groove 6c is electrically connected to the drive electrode 9 formed on the side surface of the dummy groove 5. In this case, a chamfered portion 21 is formed at a corner portion between the side surface of the dummy groove 5 and the side surface and the bottom surface of the second shallow groove 6b at an intersecting portion at which the second shallow groove 6b and the dummy groove 5 intersect with each other, and the conductive film 8 on the corner portion is removed. As a result, the conductive film 8 on the second shallow groove 6b and the conductive film 8 on the third shallow groove 6c become electrically isolated from each other.

As illustrated in FIG. 8B, the flexible substrate 15 is adhered to the terminal region R. The flexible substrate 15 has common wiring 17 formed thereon correspondingly to the second shallow groove 6b, and individual wiring 18 formed thereon correspondingly to the third shallow groove 6c. The flexible substrate 15 is adhered to the terminal region R via an anisotropic conductive film (not shown). As a result, the conductive film 8 on the bottom surface of the second shallow groove 6b is electrically connected to the drive electrode 9 on the side surface of the ejection groove 4 and the common wiring 17, and the conductive film on the bottom surface of the third shallow groove 6c is electrically connected to the two drive electrodes 9, which are formed on the side surfaces of the two dummy grooves 5 sandwiching the ejection groove 4 on the ejection groove 4 side, and the individual wiring 18.

The liquid jet head 1 is driven as follows. Liquid is supplied from a liquid tank (not shown) to the liquid supply chamber 11, to thereby fill each of the ejection grooves 4 (channels 24) via the slits 20. When a drive signal is applied to the common wiring 17 and the individual wiring 18 of the flexible substrate 15, the drive signal is transmitted to the conductive film 8 on the second shallow groove 6b and the conductive film 8 on the third shallow groove 6c. Further, the drive signal is applied to the two drive electrodes 9 on the side surfaces of the ejection groove 4, and the drive electrodes 9 on the two side walls 19 sandwiching the ejection groove 4 on the dummy groove 5 side. In this manner, an electric field is applied to side walls 19a and 19b (see FIG. 14) in a direction perpendicular to the side surface, and thus thickness slip deformation is caused. In this manner, the volume of the ejection groove 4 (channel 24) sandwiched by both the side walls 19a and 19b instantaneously increases, and then decreases. With this, a liquid droplet is ejected from the nozzle 13. In this case, one-cycle driving is performed so that liquid droplets are sequentially ejected from the respective ejection grooves 4.

The material of the actuator substrate 2, the depth and width of each of the ejection groove 4 and the first shallow groove 6a, formation of the conductive film 8 by an electroless plating method, the cover plate 10 and the nozzle plate 12, and the like are similar to those of the first embodiment, and hence description thereof is omitted. The width of each of the second shallow groove 6b and the third shallow groove 6c can be formed larger than that of each of the ejection groove 4 and the first shallow groove 6a. The depth of each of the second and third shallow grooves 6b and 6c can be set to 20 μm to 30 μm. Each of the second and third shallow grooves 6b and 6c is formed to be shallower than the total thickness of the conductive film 8 and the common wiring 17 or the individual wiring 18.

With reference to FIGS. 9 to 17, description is made of a method of manufacturing the liquid jet head 1 according to the second embodiment of the present invention. FIG. 10 is a schematic sectional view of the actuator substrate 2, which illustrates the substrate forming step S0. In the substrate forming step S0, two piezoelectric substrates, which are subjected to polarization treatment in a direction perpendicular to the substrate surface and having polarization directions directed opposite to each other, are bonded to each other with an adhesive to form the actuator substrate 2. The piezoelectric substrate 2b is formed thicker than the piezoelectric substrate 2a so that, when the ejection groove 4 and the dummy groove 5 are subsequently formed, the side wall is fixed to the piezoelectric substrate 2b. The material of the actuator substrate 2 and the like are similar to those of the first embodiment, and hence description thereof is omitted.

Figure 11A:
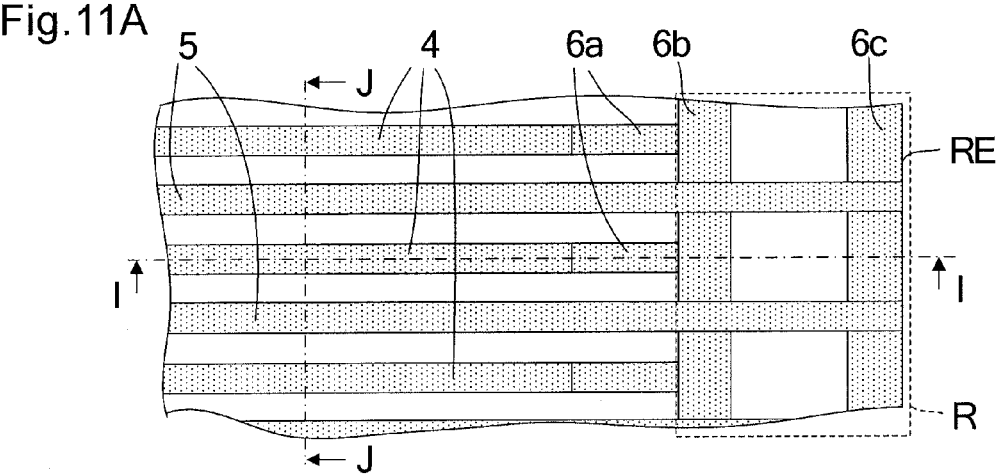
FIGS. 11A to 11C illustrate a step for manufacturing the liquid jet head according to the second embodiment of the present invention.
Figure 11B:
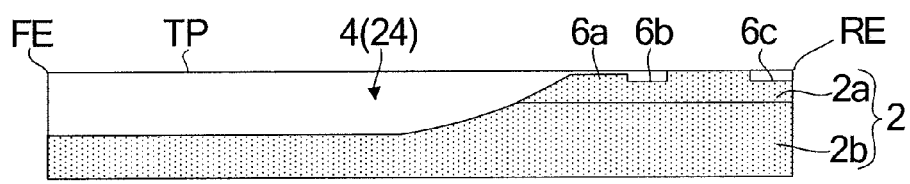
Figure 11C:
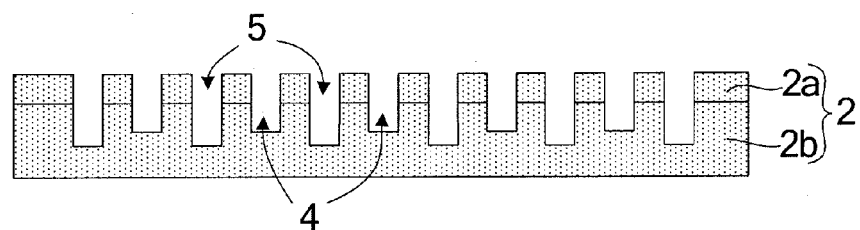

FIGS. 11A to 11C illustrate the groove forming step S1 and the shallow groove forming step S2. FIG. 11A is a schematic plan view of a part of the actuator substrate 2, FIG. 11B is a schematic sectional view taken along the line II of FIG. 11A, FIG. 11C is a schematic sectional view taken along the line JJ of FIG. 11A. In the groove forming step S1, the terminal region R is determined on the top surface TP of the actuator substrate 2 in the vicinity of the rear end RE, and the plurality of ejection grooves 4 and the dummy grooves 5 are formed. The ejection grooves 4 are arranged in parallel to each other and extend up to just in front of the terminal region R in a direction from the front end FE toward the terminal region R of the top surface TP, and the dummy groove 5 is arranged between adjacent ejection grooves 4 in parallel to the ejection grooves 4 across the actuator substrate 2 from the front end FE to the rear end RE. Then, in the shallow groove forming step S2, the first shallow groove 6a is formed between the ejection groove 4 and the terminal region R, and the second shallow groove 6b continuous to the first shallow groove 6a is formed in the terminal region R in a direction intersecting with the dummy groove 5. In addition, the third shallow groove 6c is formed in parallel to the second shallow groove 6b on the rear end RE side with respect to the second shallow groove 6b.

The ejection groove 4, the dummy groove 5, and the first to third shallow grooves 6a, 6b, and 6c can be formed by grinding with use of a dicing blade. Actually, the ejection groove 4 and the first shallow groove 6a continuous thereto are continuously formed. In other words, after the groove forming step S1 of forming the ejection groove 4, the first shallow groove 6a continuous to the ejection groove 4 is continuously formed in the shallow groove forming step S2, or the grooves are formed in the reverse order. Further, the dummy groove 5 is formed deeper than the ejection groove 4. The ejection groove 4 is formed to have a depth of 300 μm to 400 μm and a width of 40 μm to 100 μm. The top surface TP is ground in the subsequent grinding step, and hence the ejection groove 4, the dummy groove 5, and the first to third shallow grooves 6a, 6b, and 6c each have a final shape shallower than the depth obtained by grinding in the groove forming step S1 and the shallow groove forming step S2. Therefore, in the shallow groove forming step, it is desired that the grooves be formed deeper than those to be obtained as the final shapes. For example, assuming that the top surface TP is ground by about 10 μm in the subsequent grinding step, the first shallow groove 6a is formed to be continuous to the ejection groove 4 and have a depth of 10 μm to 40 μm and the same width as the ejection groove 4, and the second shallow groove 6b is formed to be continuous to the first shallow groove 6a and have a depth of 30 μm to 40 μm and a width larger than that of the first shallow groove 6a. The third shallow groove 6c can be formed to have the same depth and substantially the same width as the second shallow groove. The dummy groove 5 is formed to have substantially the same width as the ejection groove 4 or a width smaller than that of the ejection groove 4, and a depth larger than that of the ejection groove 4 by 10 μm to 100 μm. Note that, as already described above, the first shallow groove 6a may be formed deeper than the second shallow groove 6b or the third shallow groove 6c, or the grooves can be formed into the same depth.

Figure 12A:
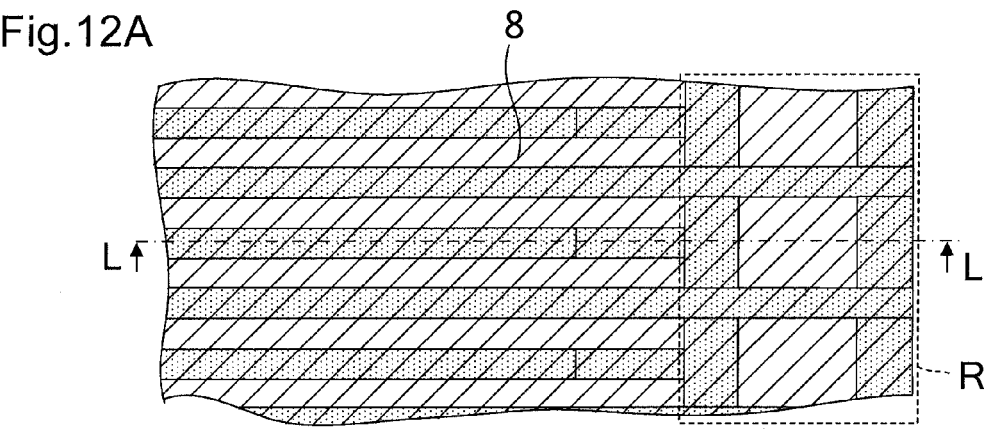
FIGS. 12A and 12B illustrate a step for manufacturing the liquid jet head according to the second embodiment of the present invention.
Figure 12B:
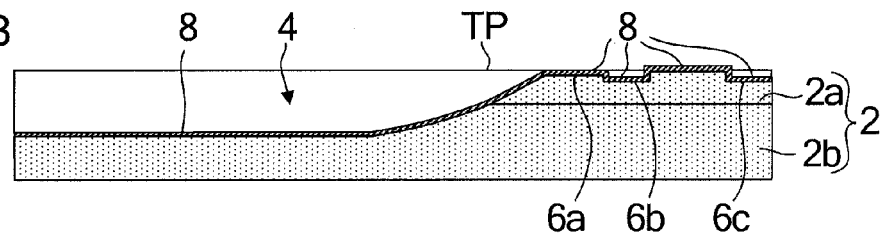

FIGS. 12A and 12B illustrate the conductive film forming step S3. FIG. 12A is a schematic plan view illustrating a part of the actuator substrate 2, and FIG. 12B is a schematic sectional view taken along the line LL of FIG. 12A. In the conductive film forming step S3, by an electroless plating method, the conductive film 8 is formed on the top surface TP of the actuator substrate 2 and the bottom surface and the side surface of each of the ejection groove 4, the dummy groove, and the first to third shallow grooves 6a to 6c. The plating pretreatment, the electroless plating method, the material, and the like are similar to those of the first embodiment, and hence description thereof is omitted.

Figure 13A:
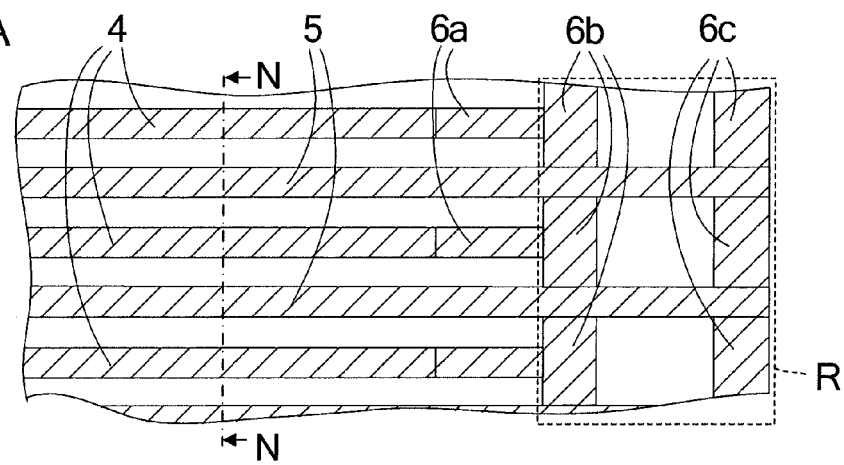
FIGS. 13A and 13B illustrate a step for manufacturing the liquid jet head according to the second embodiment of the present invention.
Figure 13B:
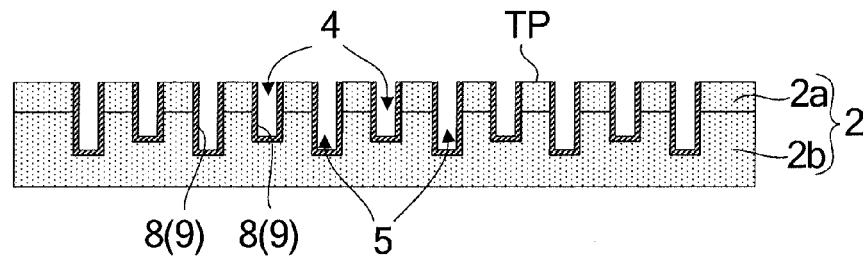

FIGS. 13A and 13B illustrate the grinding step S4. FIG. 13A is a schematic plan view illustrating a part of the actuator substrate 2, and FIG. 13B is a schematic sectional view taken along the line NN of FIG. 13A. In the grinding step S4, the conductive film 8 formed on the top surface TP of the actuator substrate 2 is ground and removed. The grinding is performed with use of, for example, a grinding blade having a large width, and the conductive film 8 and the surface layer of the top surface TP are removed. Then, a polishing surface plate is used to planarize the top surface TP. With this, the pattern of the conductive film 8 can be formed in the vicinity of the top surface TP. Note that, the conductive film 8 formed on the side surface of the ejection groove 4, that is, the drive electrode 9 is electrically connected to the second shallow groove 6b via the first shallow groove 6a. Further, the conductive film 8 formed on the side surface of the dummy groove 5, that is, the drive electrode 9 is electrically connected to the drive electrode 9 on the ejection groove 4 via the conductive film 8 deposited on the corner portion between the side surface of the dummy groove 5 and the bottom surface and the side surface of the second shallow groove 6b. Further, the drive electrode 9 formed on the side surface of the dummy groove 5 is electrically connected to the conductive film 8 on the bottom surface of the third shallow groove 6c via the conductive film 8 deposited on the corner portion between the side surface of the dummy groove 5 and the bottom surface and the side surface of the third shallow groove 6c. Therefore, in this state, the drive electrode 9 on the ejection groove 4 and the drive electrode 9 of the dummy groove 5 are electrically connected to each other.

FIG. 14 illustrates a chamfering step S7, and is a partial perspective view of the rear end RE of the actuator substrate 2. In the chamfering step S7, the corner portion between the side surface of the dummy groove 5 and the side surface and the bottom surface of the second shallow groove 6b at the intersecting portion at which the second shallow groove 6b and the dummy groove 5 intersect with each other is chamfered. For example, chamfering can be easily performed with use of a blade having a thickness slightly larger than the thickness of the dicing blade used to form the dummy groove 5. As a result, the drive electrode 9 on the side surface of the dummy groove 5 and the drive electrode 9 on the side surface of the ejection groove 4 are electrically isolated from each other, and the conductive film 8 on the second shallow groove 6b and the conductive film 8 on the third shallow groove 6c each function as a terminal electrode.

Figure 15:
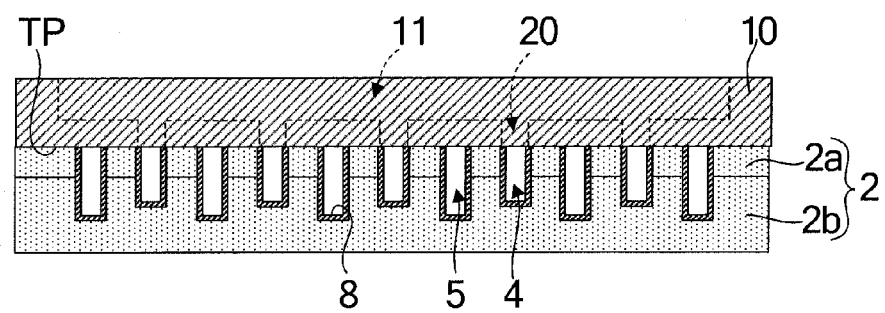
FIG. 15 illustrates a step for manufacturing the liquid jet head according to the second embodiment of the present invention.

FIG. 15 is a schematic sectional view illustrating the cover plate bonding step S5. In the cover plate bonding step S5, the cover plate 10 is bonded to the top surface TP via an adhesive while exposing the terminal region R and covering the ejection grooves 4 and the dummy grooves 5. The first shallow groove 6a is sealed with an adhesive. The liquid supply chamber 11 is formed in the cover plate 10, and the liquid supply chamber 11 and the ejection grooves 4 communicate to each other via the slits 20. The upper opening of each of the dummy grooves 5 is closed by the cover plate 10. As a result, the liquid supplied to the liquid supply chamber 11 flows into the ejection grooves 4 but does not flow into the dummy grooves 5.

Figure 16A:
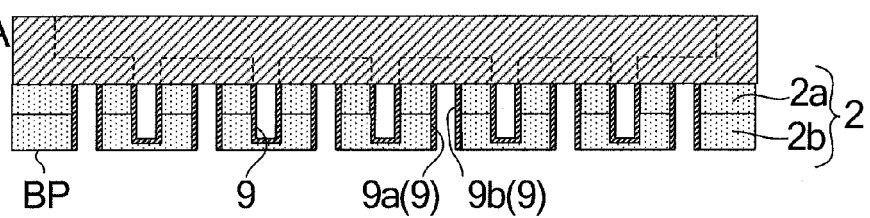
FIGS. 16A and 16B illustrate a step for manufacturing the liquid jet head according to the second embodiment of the present invention.
Figure 16B:
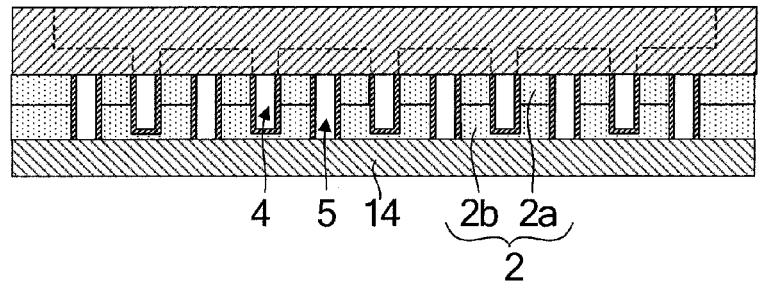

FIGS. 16A and 16B illustrate a back surface grinding step S8 and a base substrate bonding step S9. FIG. 16A is a schematic sectional view after the back surface grinding step S8, and FIG. 16B is a schematic sectional view after the base substrate bonding step S9. In the back surface grinding step S8, a back surface BP of the actuator substrate 2 on a side opposite to the top surface TP thereof is ground to remove the bottom surface of the dummy groove 5 and leave the bottom surface of the ejection groove 4. With this, the conductive film 8 formed on the bottom surface of the dummy groove 5 is removed, and drive electrodes 9a and 9b formed on both the side surfaces of the dummy groove 5 are electrically isolated from each other.

Next, in the base substrate bonding step S9, the base substrate 14 is bonded to the ground back surface BP to close the dummy grooves 5 opened at the back surface BP. As the base substrate 14, an insulator having a small relative dielectric constant is used. As a result, as compared to the case where a piezoelectric body with a large relative dielectric constant is present on the bottom surface of the dummy groove 5, the capacitive coupling between the drive electrode 9a and the drive electrode 9b reduces, and thus the crosstalk between the drive electrode 9a and the drive electrode 9b reduces.

Figure 17:
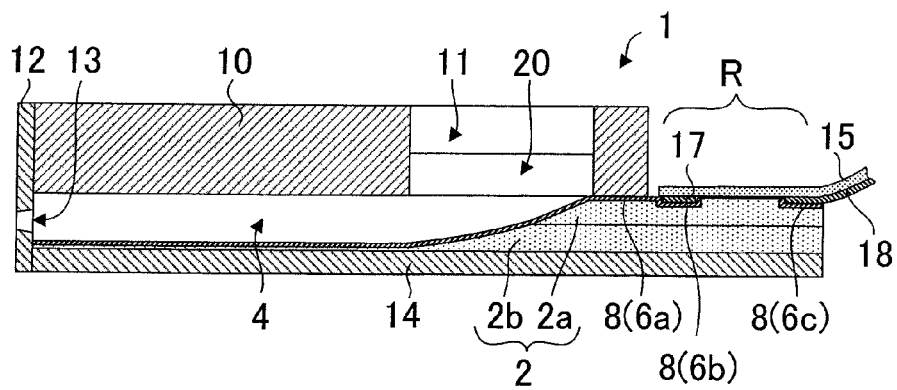
FIG. 17 illustrates a step for manufacturing the liquid jet head according to the second embodiment of the present invention.

FIG. 17 is a schematic sectional view of the liquid jet head 1, which illustrates the nozzle plate adhering step S6 and the flexible substrate adhering step S10. In the nozzle plate adhering step S6, the nozzle plate 12 is bonded to the side surface of the actuator substrate, at which the ejection grooves 4 are opened. Next, in the flexible substrate adhering step S10, the flexible substrate 15 having the common wiring 17 and the individual wiring 18 formed thereon is adhered to the terminal region R in a manner that the common wiring 17 and the conductive film 8 formed on the bottom surface of the second shallow groove 6b are electrically connected to each other and the individual wiring 18 and the conductive film 8 formed on the bottom surface of the third shallow groove 6c are electrically connected to each other.

As described above, the electrode pattern is formed without using a photosensitive resin (resist film) or photolithography and an etching method before or after the conductive film is formed by an electroless plating method, and the drive electrodes formed on both the side surfaces of the dummy groove are separated from each other at a time by a grinding method. Thus, the liquid jet head can be manufactured by a simpler method with the reduced number of manufacturing steps.

(Third Embodiment)

Figure 18A:
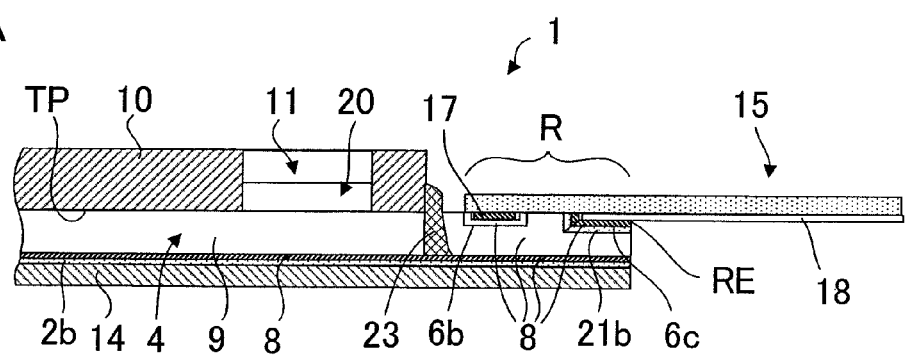
FIGS. 18A and 18B are schematic sectional views illustrating a liquid jet head according to a third embodiment of the present invention.
Figure 18B:
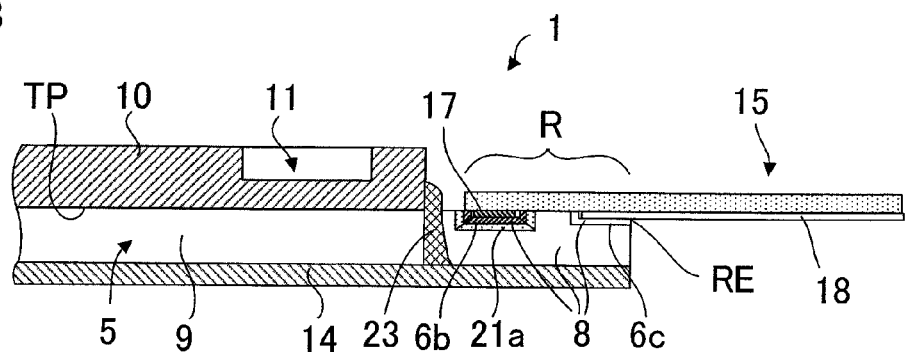

FIGS. 18A and 18B are schematic sectional views of the liquid jet head 1 according to a third embodiment of the present invention. FIG. 18A is a schematic sectional view taken along the groove direction of the ejection groove 4, and FIG. 18B is a schematic sectional view taken along the groove direction of the dummy groove 5. The third embodiment differs from the first and second embodiments in that the ejection groove 4 and the dummy groove 5 are formed across the actuator substrate 2 from the front end FE to the rear end RE, and that each of the ejection groove 4 and the dummy groove 5 is sealed by a sealing material 23 at the rear end of the cover plate 10. In the following, parts different from the second embodiment are mainly described. The same parts or parts having the same functions as the first or second embodiment are denoted by the same reference symbols.

The terminal region R is formed on the top surface TP of the actuator substrate in the vicinity of the rear end RE, and the ejection groove 4 and the dummy groove 5 are formed alternately and in parallel to each other across the top surface TP from the front end (not shown) to the rear end RE. As illustrated in FIG. 18A, at the bottom portion of the ejection groove 4, the base substrate 14 and the thin actuator substrate 2b are formed, the actuator substrate 2b being caused to remain on the base substrate 14. The conductive film 8 and the drive electrode 9 are formed on the bottom surface and the side surface of the ejection groove 4. The ejection groove 4 communicates to the liquid supply chamber 11 of the cover plate 10 via the slit 20, and is sealed by the sealing material 23 at the rear end of the cover plate 10. The second shallow groove 6b and the third shallow groove 6c are formed in the terminal region R. The second shallow groove 6b is formed in the direction intersecting with the ejection groove 4, and the third shallow groove 6c is formed in parallel to the second shallow groove 6b on the rear end RE side with respect to the second shallow groove 6b.

The conductive film 8 formed on the side surface of the ejection groove 4 on the rear end RE side and the conductive film 8 formed on the bottom surface and the side surface of the second shallow groove 6b are electrically connected to each other. The corner portion between the side surface of the ejection groove 4 and the side surface and the bottom surface of the third shallow groove 6c at the intersecting portion at which the third shallow groove 6c and the ejection groove 4 intersect with each other is chamfered to form a chamfered portion 21b. The conductive film 8 formed on the side surface of the ejection groove 4 and the conductive film 8 formed on the bottom surface and the side surface of the third shallow groove 6c are electrically isolated from each other.

As illustrated in FIG. 18B, the base substrate 14 is bonded to the back surface of the actuator substrate 2 (not shown) on the side opposite to the cover plate 10, and the base substrate 14 is exposed at the bottom portion of the dummy groove 5. The conductive film 8 and the drive electrode 9 are formed on the side surface of the dummy groove 5. The dummy groove 5 does not communicate to the liquid supply chamber 11 of the cover plate 10, and is sealed by the sealing material 23 at the rear end of the cover plate 10. The conductive film 8 formed on the side surface of the dummy groove 5 on the rear end RE side and the conductive film 8 formed on the bottom surface and the side surface of the third shallow groove 6c are electrically connected to each other. The corner portion between the side surface of the dummy groove 5 and the side surface and the bottom surface of the second shallow groove 6b at the intersecting portion at which the second shallow groove 6b and the dummy groove 5 intersect with each other is chamfered to form a chamfered portion 21a. The conductive film 8 formed on the side surface of the dummy groove 5 and the conductive film 8 formed on the bottom surface and the side surface of the second shallow groove 6b are electrically isolated from each other.

Figure 20:
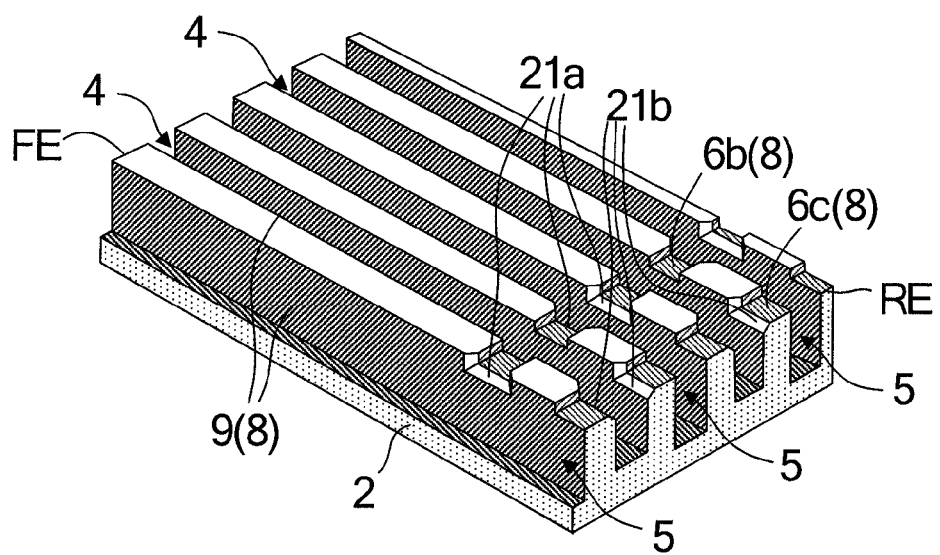
FIG. 20 is a schematic perspective view illustrating the actuator substrate after a chamfering step of the liquid jet head according to the third embodiment of the present invention.

FIG. 20 is a perspective view of the actuator substrate 2 after the chamfering step in a method of manufacturing the liquid jet head 1 to be described later. With reference to FIG. 20, the second shallow groove 6b and the third shallow groove 6c are described. The ejection groove 4 and the dummy groove 5 are alternately formed in the top surface of the actuator substrate 2. Then, the chamfered portion 21a is formed at the corner portion between the side surface of the dummy groove 5 and the side surface and the bottom surface of the second shallow groove 6b at the intersecting portion at which the second shallow groove 6b and the dummy groove 5 intersect with each other. Similarly, the chamfered portion 21b is formed at the corner portion between the side surface of the ejection groove 4 and the side surface and the bottom surface of the third shallow groove 6c at the intersecting portion at which the third shallow groove 6c and the ejection groove 4 intersect with each other. At the chamfered portion 21a, the conductive film 8 is removed, and the drive electrode 9 on the side surface of the dummy groove 5 and the conductive film 8 on the bottom surface of the second shallow groove 6b are electrically isolated from each other. Further, at the chamfered portion 21b, the conductive film 8 is removed, and the drive electrode 9 on the side surface of the ejection groove 4 and the conductive film 8 on the bottom surface of the third shallow groove 6c are electrically isolated from each other. With this, the drive electrode 9 formed on the side surface of the ejection groove 4 and the drive electrode 9 formed on the side surface of the dummy groove 5 are electrically isolated from each other.

Referring back to FIGS. 18A and 18B, the flexible substrate 15 including the common wiring 17 and the individual wiring 18 is adhered to the terminal region R. The common wiring 17 of the flexible substrate 15 is electrically connected to the conductive film 8 on the second shallow groove 6b via an anisotropic conductive film (not shown), and the individual wiring 18 thereof is electrically connected to the conductive film 8 on the third shallow groove 6c via an anisotropic conductive film (not shown). Other configurations are similar to those of the second embodiment.

The method of manufacturing the liquid jet head 1 according to the third embodiment is basically the same as the method of manufacturing the liquid jet head 1 according to the second embodiment. In the following, description is made of different points. In the groove forming step S1, the ejection groove 4 is formed across the top surface TP of the actuator substrate 2 from the front end FE to the rear end RE, and the dummy groove 5 is formed across the top surface TP of the actuator substrate 2 between adjacent ejection grooves 4 in parallel to the ejection grooves 4 from the front end FE to the rear end RE. In this case, similarly to the second embodiment, the dummy groove 5 is formed deeper than the ejection groove 4. Next, the shallow groove forming step S2, the conductive film forming step S3, and the grinding step S4 are carried out. Those steps are similar to those in the second embodiment, and hence description thereof is omitted.

Figure 19:
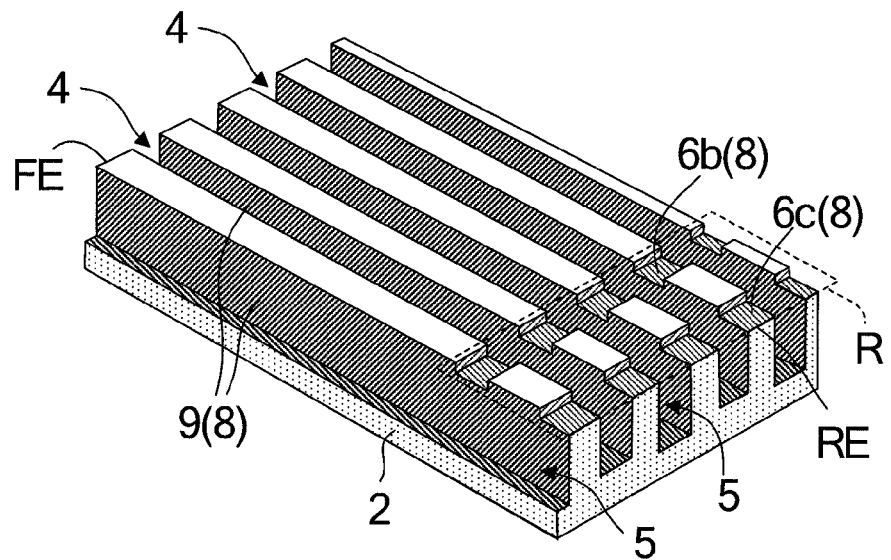
FIG. 19 is a schematic perspective view illustrating an actuator substrate after a grinding step of the liquid jet head according to the third embodiment of the present invention.

FIG. 19 is a schematic perspective view of the actuator substrate 2 after the grinding step S4 of the liquid jet head 1 according to the third embodiment of the present invention. As illustrated in FIG. 19, the ejection groove 4 and the dummy groove 5 are formed across the actuator substrate 2 from the front end FE to the rear end RE, and in the terminal region R, the second shallow groove 6b and the third shallow groove 6c are formed in the direction intersecting with the ejection groove 4 and the dummy groove 5. The conductive film 8 is formed on the side surface and the bottom surface of each of the ejection groove 4, the dummy groove 5, the second shallow groove 6b, and the third shallow groove 6c.

Next, as illustrated in FIG. 20, in the chamfering step S7, the corner portion between the side surface of the dummy groove 5 and the side surface and the bottom surface of the second shallow groove 6b at the intersecting portion at which the second shallow groove 6b and the dummy groove 5 intersect with each other is chamfered to form the chamfered portion 21a, and thus the drive electrode 9 on the dummy groove 5 and the conductive film 8 on the bottom surface of the second shallow groove 6b are electrically isolated from each other. Further, the corner portion between the side surface of the ejection groove 4 and the side surface and the bottom surface of the third shallow groove 6c at the intersecting portion at which the third shallow groove 6c and the ejection groove 4 intersect with each other is chamfered to form the chamfered portion 21b, and thus the conductive film 8 on the ejection groove 4 and the conductive film 8 on the bottom surface of the third shallow groove 6c are electrically isolated from each other.

Next, the cover plate bonding step S5, the back surface grinding step S8, the base substrate bonding step S9, the nozzle plate adhering step S6, and the flexible substrate adhering step S10 are carried out. Those steps are similar to those in the second embodiment, and hence description thereof is omitted. Note that, the opening of each of the ejection grooves 4 on the rear side is sealed by the sealing material 23 (not shown).

As described above, the ejection groove 4 and the dummy groove 5 are straightly formed across the actuator substrate 2 from the front end FE to the rear end RE. Therefore, there is no region at which the outer shape of the dicing blade is transferred to the ejection groove 4, and the length between the front end FE and the rear end RE can be significantly reduced. Therefore, the liquid jet head 1 can be downsized. Further, as already described above, it is unnecessary to form a photosensitive resin and perform photolithography and etching treatment before or after the conductive film 8 is formed. Therefore, the liquid jet head 1 can be manufactured by a simpler method with the reduced number of manufacturing steps.

(Fourth Embodiment)

Figure 21:
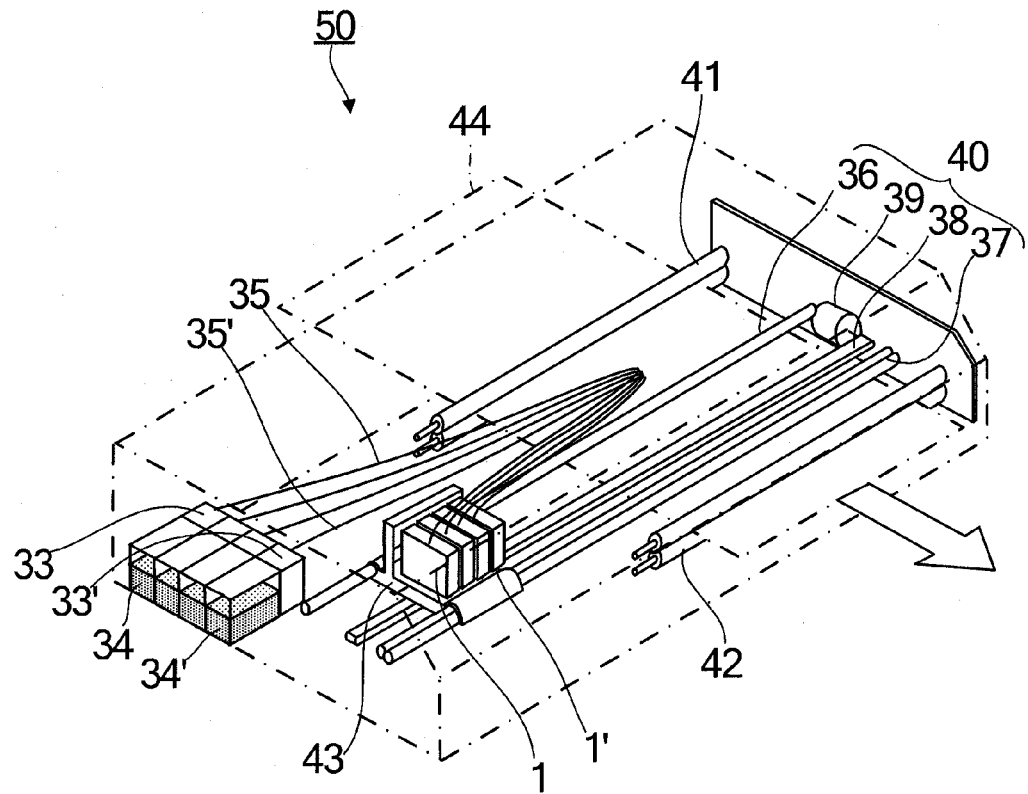
FIG. 21 is a schematic perspective view illustrating a liquid jet apparatus according to a fourth embodiment of the present invention.
Figure 22:
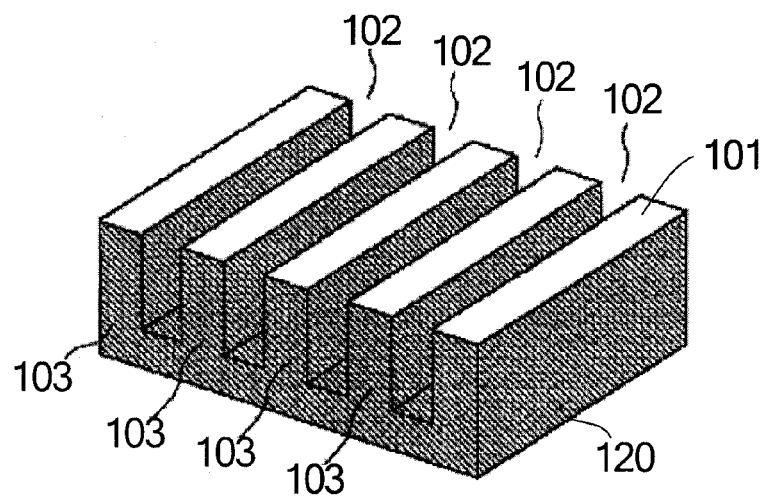
FIG. 22 is a perspective view illustrating a piezoelectric material substrate in which a plating film is removed from upper surfaces of drive walls by a lift-off method according to a conventionally-known method.
Figure 23A:
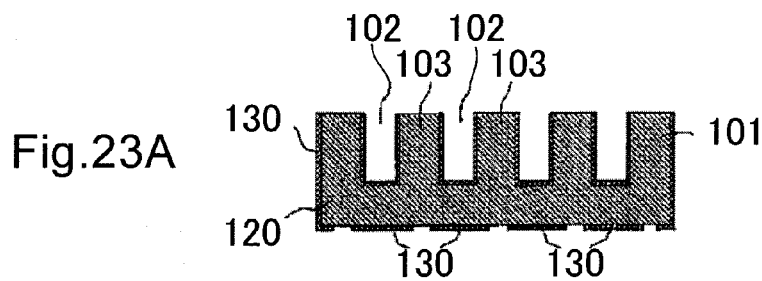
FIGS. 23A to 23C illustrate surfaces of the piezoelectric material substrate including a patterned resist film according to the conventionally-known method.
Figure 23B:
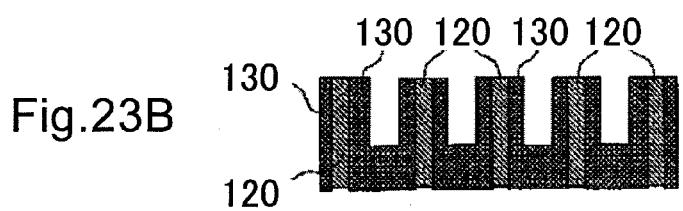
Figure 23C:
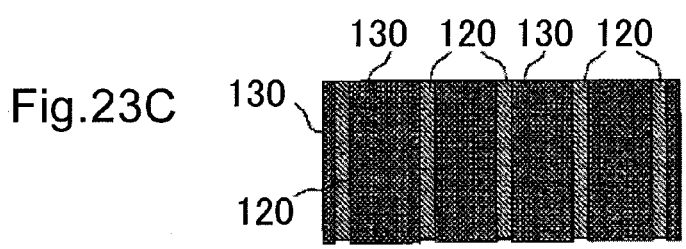
Figure 24A:
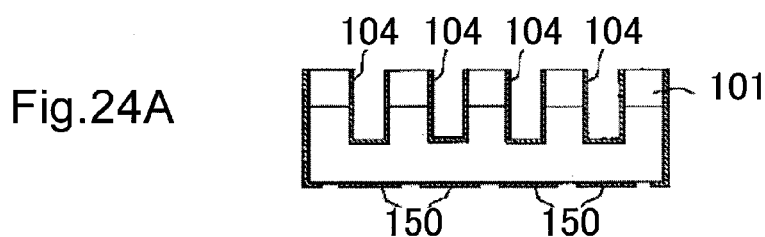
FIGS. 24A to 24C illustrate the surfaces of the piezoelectric material substrate after etching treatment according to the conventionally-known method.
Figure 24B:
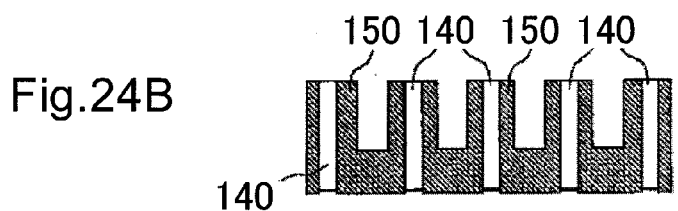
Figure 24C:
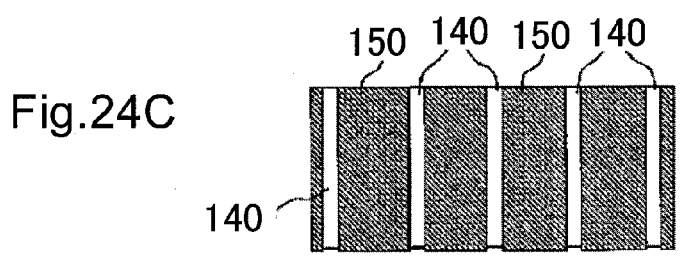

FIG. 21 is a schematic perspective view of a liquid jet apparatus 50 according to a fourth embodiment of the present invention. The liquid jet apparatus 50 includes a moving mechanism 40 for reciprocating liquid jet heads 1 and 1', flow path portions 35 and 35' for supplying liquid to the liquid jet heads 1 and 1' and collecting the liquid from the liquid jet heads 1 and 1', and liquid pumps 33 and 33' and liquid tanks 34 and 34' for supplying liquid to the flow path portions 35 and 35'. Each of the liquid jet heads 1 and 1' includes a plurality of head chips, and each head chip includes a plurality of channels. A liquid droplet is ejected through a nozzle which communicates to each of the channels. As the liquid jet heads 1 and 1', any ones of the liquid jet heads of the first to third embodiments described above are used.

The liquid jet apparatus 50 includes a pair of conveyance means 41 and 42 for conveying a recording medium 44 such as paper in a main scanning direction, the liquid jet heads 1 and 1' for ejecting liquid toward the recording medium 44, a carriage unit 43 having the liquid jet heads 1 and 1' mounted thereon, the liquid pumps 33 and 33' for pressurizing and supplying liquid stored in the liquid tanks 34 and 34' to the flow path portions 35 and 35', and the moving mechanism 40 for causing the liquid jet heads 1 and 1' to scan in a sub-scanning direction which is orthogonal to the main scanning direction. A control portion (not shown) controls and drives the liquid jet heads 1 and 1', the moving mechanism 40, and the conveyance means 41 and 42.

Each of the pair of conveyance means 41 and 42 includes a grid roller and a pinch roller which extend in the sub-scanning direction and which rotate with roller surfaces thereof being in contact with each other. A motor (not shown) axially rotates the grid rollers and the pinch rollers to convey, in the main scanning direction, the recording medium 44 sandwiched therebetween. The moving mechanism 40 includes a pair of guide rails 36 and 37 which extends in the sub-scanning direction, the carriage unit 43 which is slidable along the pair of guide rails 36 and 37, an endless belt 38 which is coupled to the carriage unit 43, for moving the carriage unit 43 in the sub-scanning direction, and a motor 39 for revolving the endless belt 38 via a pulley (not shown).

The carriage unit 43 has the plurality of liquid jet heads 1 and 1' mounted thereon for ejecting, for example, four kinds of liquid droplets: yellow; magenta; cyan; and black. The liquid tanks 34 and 34' store liquid of corresponding colors, and supply the liquid via the liquid pumps 33 and 33' and the flow path portions 35 and 35' to the liquid jet heads 1 and 1'. The respective liquid jet heads 1 and 1' eject liquid droplets of the respective colors in accordance with a drive signal. Through control of ejection timings of liquid from the liquid jet heads 1 and 1', rotation of the motor 39 for driving the carriage unit 43, and conveyance speed of the recording medium 44, an arbitrary pattern may be recorded on the recording medium 44.

What is claimed is:

1. A method of manufacturing a liquid jet head, comprising:
    determining a terminal region on a top surface of an actuator substrate in the vicinity of a rear end thereof;
    forming on the top surface a plurality of ejection grooves and a dummy groove between each two adjacent ejection grooves, the ejection grooves and the dummy grooves being arranged in parallel to each other and in a direction from a front end toward the terminal region of the top surface;
    forming shallow grooves in the terminal region, the forming shallow grooves comprising
        forming a first shallow groove between corresponding ones of the ejection grooves and the terminal region, each first shallow groove being continuous to its corresponding ejection groove,
        forming a second shallow groove, which is continuous to the first shallow grooves and which extends in a direction intersecting with the dummy grooves, in the terminal region, and
        forming a third shallow groove in parallel to the second shallow groove on the rear end side with respect to the second shallow groove;
    chamfering a corner portion between a side surface of the dummy grooves and a side surface and a bottom surface of the second shallow groove at an intersecting portion at which the second shallow groove and the dummy grooves intersect with each other;
    forming a conductive film on the top surface, a side surface and a bottom surface of each of the plurality of ejection grooves, and a side surface and a bottom surface of the shallow grooves;
    grinding and removing the conductive film formed on the top surface;
    bonding a cover plate on the top surface while exposing the terminal region and covering the plurality of ejection grooves; and
    adhering a nozzle plate on a side surface of the actuator substrate, at which the plurality of ejection grooves are opened.

2. A method of manufacturing a liquid jet head according to claim 1, further comprising:
    grinding a back surface of the actuator substrate on a side opposite to the top surface, to thereby remove the conductive film formed on a bottom surface of the dummy groove; and
    bonding a base substrate to the back surface.

3. A method of manufacturing a liquid jet head according to claim 1, further comprising adhering a flexible substrate having common wiring and individual wiring formed thereon to the terminal region in a manner that the common wiring and the conductive film formed on the bottom surface of the second shallow groove are electrically connected to each other and that the individual wiring and the conductive film formed on a bottom surface of the third shallow groove are electrically connected to each other.

4. A method of manufacturing a liquid jet head according to claim 1, further comprising chamfering
    a corner portion between a side surface of each of the ejection grooves and a side surface and a bottom surface of the third shallow groove at an intersecting portion at which the third shallow groove and the ejection grooves intersect with each other.

5. A method of manufacturing a liquid jet head according to claim 4, further comprising:
    grinding a back surface of the actuator substrate on a side opposite to the top surface, to thereby remove the conductive film formed on a bottom surface of the dummy groove; and
    bonding a base substrate to the back surface.

6. A method of manufacturing a liquid jet head according to claim 4, further comprising adhering a flexible substrate having common wiring and individual wiring formed thereon to the terminal region in a manner that the common wiring and the conductive film formed on the bottom surface of the second shallow groove are electrically connected to each other and that the individual wiring and the conductive film formed on the bottom surface of the third shallow groove are electrically connected to each other.

7. A method of manufacturing a liquid jet head according to claim 1, wherein the forming a conductive film comprises forming the conductive film by a plating method.

* * * * *